(12) United States Patent
Hugonin et al.

(10) Patent No.: US 10,953,352 B2
(45) Date of Patent: Mar. 23, 2021

(54) FLUID TREATMENT SYSTEM AND METHOD OF USE UTILIZING A MEMBRANE

(71) Applicant: Baleen Process Solutions, Scott, LA (US)

(72) Inventors: Jarid Hugonin, Lafayette, LA (US); Giovanni Occhipinti, Katy, TX (US); Mike Johnson, Mandeville, LA (US)

(73) Assignee: Baleen Process Solutions, Scott, LA (US)

( * ) Notice: Subject to any disclaimer, the term of this patent is extended or adjusted under 35 U.S.C. 154(b) by 0 days.

(21) Appl. No.: 16/592,157

(22) Filed: Oct. 3, 2019

(65) Prior Publication Data
US 2020/0047088 A1 Feb. 13, 2020

Related U.S. Application Data

(63) Continuation-in-part of application No. 15/600,235, filed on May 19, 2017, now abandoned, and a
(Continued)

(51) Int. Cl.
*B01D 24/00* (2006.01)
*C02F 9/00* (2006.01)
(Continued)

(52) U.S. Cl.
CPC .......... *B01D 23/14* (2013.01); *B01D 17/0208* (2013.01); *B01D 17/0214* (2013.01); *B01D 17/0217* (2013.01); *B01D 17/041* (2013.01); *B01D 17/085* (2013.01); *B01D 21/267* (2013.01); *B01D 61/18* (2013.01); *C02F 9/00* (2013.01); *B01D 2311/25* (2013.01);
(Continued)

(58) Field of Classification Search
CPC .. B01D 23/14; B01D 17/0214; B01D 17/085; B01D 17/0208; B01D 17/0217; B01D 17/041; B01D 21/267; B01D 2311/25; B01D 2311/2649; B01D 2317/04; B01D 61/16; B01D 61/14; B01D 61/18; C02F 9/00; C02F 2103/10; C02F 2103/001
See application file for complete search history.

(56) References Cited

U.S. PATENT DOCUMENTS

| 1,530,078 | A | * | 3/1925 | Haynes | ............. B01D 17/0211 210/242.3 |
| 2,688,380 | A | | 7/1951 | MacHenry | |

(Continued)

FOREIGN PATENT DOCUMENTS

| CN | 203284265 | 11/2013 |
| EP | 1201286 | 5/2002 |

OTHER PUBLICATIONS

EIFOAM p. 400.
ELFOAM Tech Data Sheet.
ELIOT Transition Letter.

*Primary Examiner* — Liam Royce
(74) *Attorney, Agent, or Firm* — Stephens Domnitz Meineke, PLLC

(57) ABSTRACT

A variable oil field fluid treatment system and method of use which utilizes a pump, a desanding hydrocyclone, and/or a non-consumable or consumable mechanical solids filter, a membrane filtration unit, a pump, a granular carbon filter, and/or combinations therein.

20 Claims, 9 Drawing Sheets

Related U.S. Application Data continuation-in-part of application No. 15/600,277, filed on May 19, 2017.

(51) Int. Cl.

| | | |
|---|---|---|
| *B01D 17/02* | (2006.01) | |
| *B01D 17/00* | (2006.01) | |
| *B01D 61/18* | (2006.01) | |
| *B01D 21/26* | (2006.01) | |
| *B01D 17/04* | (2006.01) | |
| *B01D 61/16* | (2006.01) | |
| *B01D 61/14* | (2006.01) | |
| *C02F 103/10* | (2006.01) | |
| *C02F 103/00* | (2006.01) | |

(52) U.S. Cl.
CPC .... *B01D 2317/04* (2013.01); *C02F 2103/001* (2013.01); *C02F 2103/10* (2013.01)

(56) References Cited

U.S. PATENT DOCUMENTS

| | | |
|---|---|---|
| 3,450,632 A | 6/1969 | Olson |
| 3,738,492 A | 6/1973 | Grant |
| 4,309,289 A | 1/1982 | Head |
| 4,411,791 A | 10/1983 | Grant |
| 4,454,044 A | 6/1984 | Klein |
| 4,830,755 A * | 5/1989 | Hardin .............. B01D 17/0202 210/662 |
| 4,938,876 A | 7/1990 | Ohsol |
| 4,990,246 A | 2/1991 | Blazejczak |
| 5,248,415 A | 9/1993 | Masuda |
| 5,273,572 A | 12/1993 | Baker |
| 5,306,350 A | 4/1994 | Hoy |
| 5,700,310 A | 12/1997 | Bowman et al. |
| 5,712,358 A | 1/1998 | Sojka |
| 5,730,878 A | 3/1998 | Rice |
| 6,159,591 A | 2/2000 | Beihoffer |
| 6,077,433 A | 6/2000 | Henriksen |
| 6,183,650 B1 | 2/2001 | Drummond |
| 6,283,212 B1 | 9/2001 | Hinkel et al. |
| 6,337,023 B1 | 1/2002 | Broussard |
| 6,358,422 B1 | 3/2002 | Smith |
| 6,398,951 B1 | 6/2002 | Smith |
| 6,398,966 B1 | 6/2002 | Smith |
| 6,416,668 B1 | 7/2002 | Al-Samadi |
| 6,422,396 B1 | 7/2002 | Li |
| 6,733,636 B1 | 5/2004 | Heins |
| 6,902,678 B2 | 6/2005 | Tipton |
| 7,297,279 B2 | 11/2007 | Johnson |
| 7,416,667 B2 | 8/2008 | Benachenou |
| 7,497,954 B2 | 3/2009 | Ivan |
| 7,727,628 B2 | 6/2010 | Veronneau |
| 7,815,804 B2 | 10/2010 | Nagghappen |
| 8,097,163 B1 | 1/2012 | Stewart |
| 8,257,589 B2 | 9/2012 | Fraser |
| 8,277,547 B2 | 10/2012 | Folkvang |
| 8,568,515 B2 | 10/2013 | Mantilla |
| 8,573,303 B2 | 11/2013 | Kerfoot |
| 8,721,895 B2 | 5/2014 | Benachenou |
| 8,727,007 B1 | 5/2014 | Lewis |
| 9,120,686 B2 | 9/2015 | Kuehnle |
| 9,266,748 B1 | 2/2016 | Govindan |
| 2004/0079706 A1* | 4/2004 | Mairal .................. B63J 4/004 210/651 |
| 2006/0049108 A1 | 3/2006 | Veronneau |
| 2006/0163177 A1 | 7/2006 | Johnson |
| 2006/0186056 A1 | 8/2006 | Ivan |
| 2006/0207234 A1 | 9/2006 | Ward |
| 2007/0102359 A1 | 5/2007 | Lombardi |
| 2007/0251876 A1 | 11/2007 | Krogue |
| 2008/0287323 A1 | 11/2008 | Li |
| 2009/0039021 A1 | 2/2009 | Benachenou |
| 2009/0134068 A1 | 5/2009 | Falkiner |
| 2009/0204419 A1 | 8/2009 | Stewart |
| 2009/0294375 A1 | 12/2009 | Lange |
| 2010/0267852 A1 | 10/2010 | Fraser |
| 2012/0079852 A1 | 4/2012 | Northrop |
| 2012/0234765 A1 | 9/2012 | SenGupta |
| 2013/0023448 A1 | 1/2013 | Glasscott |
| 2013/0075334 A1* | 3/2013 | Prakash .................. C02F 9/00 210/640 |
| 2013/0213893 A1 | 8/2013 | Posa |
| 2013/0233786 A1 | 9/2013 | Posa |
| 2013/0264284 A1* | 10/2013 | Dixit .................. B01D 63/06 210/636 |
| 2013/0313199 A1 | 11/2013 | Marcin |
| 2013/0341270 A1 | 12/2013 | Butters |
| 2014/0008271 A1 | 1/2014 | Moene |
| 2014/0131279 A1 | 5/2014 | Seibert |
| 2014/0326677 A1 | 11/2014 | Kinasewich |
| 2015/0307374 A1* | 10/2015 | Giraldo .................. C02F 9/00 204/627 |
| 2016/0102006 A1* | 4/2016 | Blumenschein .......... C02F 1/04 210/638 |
| 2018/0009681 A1* | 1/2018 | Cam .................... C02F 9/00 |

* cited by examiner

FLUID TREATMENT SYSTEM AND METHOD OF USE UTILIZING A MEMBRANE

CROSS-REFERENCE TO RELATED APPLICATIONS

This application is a Continuation-in-Part and claims priority to U.S. patent application Ser. No. 15/600,235, filed on May 19, 2017, and Ser. No. 15/600,277 filed on May 19, 2017, which are incorporated by reference herein in their entirety.

STATEMENT REGARDING FEDERALLY SPONSORED RESEARCH

Not applicable.

BACKGROUND

The present invention generally relates to the treatment of well fluids, and oilfield wastewater. Relevant background information is discussed below.

The U.S. Environmental Protection Agency (EPA) generally defines an injection well as a bored, drilled, or driven shaft, or a dug hole that is deeper than it is wide or an improved sinkhole, or a subsurface fluid distribution system. Some deep wells that are designed to inject hazardous wastes or carbon dioxide deep below the Earth's surface have multiple layers of protective casing and cement, whereas shallow wells injecting non-hazardous fluids into or above drinking water sources are more simply constructed.

In some wastewater disposals, treated wastewater is injected into the ground between impermeable layers of rocks to avoid polluting fresh water supplies or adversely affecting the quality of receiving waters. Injection wells are usually constructed of solid walled pipe to a deep elevation in order to prevent injectate from mixing with the surrounding environment.

Injection wells can be one method for disposal of treated wastewater. Unlike outfalls (which is discharging on the ground or local stream), or other direct disposal techniques, injection wells utilize the Earth as a filter to further clean the treated wastewater before it reaches the receiving water. This method of wastewater disposal also serves to spread the injectate over a wide area, further decreasing environmental impacts.

There are, in general, disposals for well injections on platforms at sea, and on land, when water does not meet customer specifications. Some of these waters are disposed to a boat which transports the materials to land for treatment and disposal. Some companies dispose to tanks on platforms, then transport, treat, and dispose of the water on land. In other variations, there are pumps used to pump well injections into pipelines for transport to salt caverns on land.

Salt caverns are cavities, or chambers, formed in underground salt deposits. Although cavities may naturally form in salt deposits, some caverns are intentionally created by humans for specific purposes, such as for storage of petroleum products or disposal of wastes.

Some removal solutions involve treatment with absorption technologies for discharge overboard from the platform. Some utilize hydrocyclones as well or utilize both technologies in treatment procedures. Some systems treat with coalescing technologies for discharge overboard. Some systems treat with diatomaceous earth technologies. Some systems utilize centrifuge and/or absorption or coalescing technologies. Some removal solutions use conventional solids filtration. Some removal solutions utilize dissolved gas flotation or induced gas flotation technologies.

Within some water-treatment equipment, the process of coalescence takes place; that is, small oil droplets collide and form bigger droplets. Coalescing can also occur in the pipe downstream of pumps and control valves; if enough residence time is given. However, in such instances, the process of dispersion will govern the maximum size of stable oil droplets that can exist. For normal pipe diameters and flow velocities, particles of 500 to 5000 μm are possible.

A centrifugal water-oil separator, centrifugal oil-water separator or centrifugal liquid-liquid separator is a device designed to separate oil and water by centrifugation. It generally contains a cylindrical container that rotates inside a larger stationary container. The denser liquid, usually water, accumulates at the periphery of the rotating container and is collected from the side of the device, whereas the less dense liquid, usually oil, accumulates at the rotation axis and is collected from the center.

Conventional technologies involved with water treatment and removal often contain oil and grease which utilize expensive chemicals or consumable media that requires disposal on land. These consumable media technologies become cost prohibitive as they consume the oil to be removed and still require further disposal. Traditional oil absorbing media needs to be disposed once it is utilized, as it becomes a waste product.

A Floating Production, Storage and Offloading ("FPSO") unit is a floating vessel used by the offshore oil and gas industry for the production and processing of hydrocarbons, and for the storage of oil. Produced water that does not meet discharge or injection criteria diverted into oil storage tanks on FPSO is typically called "slop water". A FPSO vessel is designed to receive hydrocarbons produced by itself, or from nearby platforms, or subsea template, process them, and store oil until it can be offloaded onto a tanker or, less frequently, transported through a pipeline. FPSOs are preferred in frontier offshore regions as they are easy to install, and do not require a local pipeline infrastructure to export oil. FPSOs can be a converted oil tanker or can be a vessel built specially for the application.

Slop waters are generated from off specification produced water not suitable for overboard discharge and oily water skimmings from flotation technologies and hydrocyclone rejects. Skimmings, or rejects, are a percentage of the fluid that is not sent out of the discharge of the equipment, but is recycled back into the front of the total process. The rejects are mostly water, so they will be recycled back into the total system further upstream.

Slop water can be stored in the compartments within the hull of the ship for days, weeks, months or even years. During this timeframe, chemicals are added to control corrosion, bacteria and $H_2S$ content of the slop water; this causes emulsions to be formed due to the fine solids generated in this treatment. Due to these emulsions, hydrocarbons will not typically be separated from the slop water by gravity separation.

Increased volumes of slop water in tanks reduces the oil storage capacity of these facilities significantly, affecting the economics of an operation. Since the same storage tanks that are designed to hold bulk oil will also hold slop water, the more slop water that is in the tanks, the less amount of oil can be stored. Once the storage tanks are full, whether it is with slop water or oil, the oil will need to be off-loaded.

Deck drainage water, in oil and/or gas drilling and production, comes from collected rainwater and miscellaneous fluids such as oils and greases on a deck of a platform. Typically, several drains are spread throughout one or more decks of the offshore platform, especially on portions of the decks which are open and therefore exposed to the weather. Since the rainwater washes any spilled oil or grease off the deck and into the drains, the rainwater cannot be passed directly into the body of water beneath the platform. Instead, the collected rainwater must be treated to separate the oil from the water until the percentage of oil in the water reaches an acceptable level.

Presently, laws, such as the Clean Water Act, prohibit discharging "pollutants" through a "point source" into a "water of the United States" unless they have an NPDES permit. The permit will contain limits on what an entity can discharge, monitoring and reporting requirements, and other provisions to ensure that the discharge does not hurt water quality or people's health. In essence, the permit translates general requirements of the Clean Water Act into specific provisions tailored to the operations of each person discharging pollutants. Typically (as the governing country's ordinances permit), as little as twenty-nine parts per million "ppm" of oil in water is permitted in the water to be returned to the body of water beneath the platform (in some areas of the world it is 15 ppm).

After primary and secondary recovery, chemical enhanced oil recovery technology can extract almost 20% of additional oil from a reservoir. Polymer flooding is an established chemical enhanced oil recovery process, where an aqueous polymeric solution with a viscosity closely matched to the oil is injected to enhance the mobility of fluid in the reservoir. The fluid injection profile is improved through the addition of polymers, making it more consistent and stable, enhancing the displacement efficiency.

During the primary recovery stage, reservoir drive comes from several natural mechanisms. These include: natural water displacing oil downward into the well, expansion of the natural gas at the top of the reservoir, expansion of gas initially dissolved in the crude oil, and gravity drainage resulting from the movement of oil within the reservoir from the upper to the lower parts where the wells are located.

When underground pressure in the oil reservoir is sufficient to force the oil to the surface, all that is necessary is to place a complex arrangement of valves on the well head to connect the well to a pipeline network for storage and processing. Sometimes pumps, such as beam pumps and electrical submersible pumps (ESPs), are used to bring the oil to the surface; these are known as artificial lifting mechanisms.

Over the lifetime of the well the pressure falls, and at some point, there is insufficient underground pressure to force the oil to the surface. After natural reservoir drive diminishes, secondary recovery methods are applied. Secondary recovery methods can rely on the supply of external energy into the reservoir in the form of injecting fluids to increase reservoir pressure, hence replacing or increasing the natural reservoir drive with an artificial drive. Secondary recovery techniques increase the reservoir's pressure by water injection, natural gas reinjection and gas lift, which injects air, carbon dioxide or some other gas into the bottom of an active well, reducing the overall density of fluid in the wellbore.

The performance of the polymeric solutions used largely relies on their rheological properties, and therefore, detailed rheological characterization under relevant conditions supports performance optimization. In addition to the polymers, surfactants can also be added to add additional extraction capabilities. Polymer flooding will increase the viscosity of the water and surfactants will create a tighter oil water emulsion, while the water returning to the surface will be difficult for standard water treatment equipment to maintain efficiencies in recapture.

Oil and gas operators may use acid treatment (acidizing) to improve well productivity. The assortment of drilling fluids pumped down the well during drilling and completion can often cause damage to the surrounding formation by entering the reservoir rock and blocking the pore throats. Similarly, the act of perforating can have a similar effect by jetting debris into the perforation channels. Both these situations reduce the permeability in the near well bore area and so reduce the flow of fluids into the well bore.

One solution is to pump diluted acid mixtures from surface into the well to dissolve the offending material. Once dissolved, permeability should be restored and the reservoir fluids will flow into the well bore, cleaning up what is left of the damaging material. After initial completion, it is common to use minimal amounts of formic acid to clean up any mud and skin damage. In this situation, the process is loosely referred to as "well stimulation."

In some instances, pumping from the surface is insufficient, as it does not target any particular location downhole and reduces the chances of the chemical retaining its effectiveness when it gets to its intended location. In these cases, it is necessary to spot the chemical directly at its target through the use of coiled tubing. Coiled tubing is run in hole with a jetting tool on the end. When the tool is at its target, the chemical is pumped through the pipe and is jetted directly onto the damaged area.

The development of effective corrosion inhibitors and the use and further development of acid treatment (acidizing) of oil and gas wells proliferated and led to the establishment of the well stimulation services industry.

Acid washing is most commonly performed with hydrochloric acid (HCl) mixtures, but other acids can be used to clean out scale (such as calcium carbonate), rust, and other debris restricting flow in the well. Matrix and fracture acidizing are both formation treatments. The acid treatment is injected below the formation fracturing pressure. In fracture acidizing, acid is pumped above the formation fracturing pressure. The purpose of fracture acidizing is to restore or improve an oil or gas well's productivity by dissolving material in the productive formation that is restricting oil and water flow, or to dissolve the formation rock itself to enhance existing flow paths, or to create new oil and water flow paths to the wellbore.

There are applications in which a solids-free liquid is used to "complete" an oil or gas well. In these applications, the fluid is placed in the well to facilitate final operations prior to initiation of production. The fluid is meant to control a wellbore pressure should downhole hardware fail, without damaging the producing formation or completion components.

Completion fluids are typically brines (chlorides, bromides and formates), but in theory could be any fluid of proper density and flow characteristics. The fluid should be chemically compatible with the reservoir formation and fluids and is typically filtered to a high degree to avoid introducing solids to the near-wellbore area. Seldom is a regular drilling fluid suitable for completion operations due to its solids content, pH and ionic composition.

Sometimes brine will be lost to the formation if the hydrostatic pressure of the brine is higher than the well bore pressure. If the weight of the brine has a higher hydrostatic pressure compared to the wellbore pressure, the brine will go into the formation. If the wellbore pressure is higher than the hydrostatic pressure of the brine, the well fluids will move upward towards the surface. Additives can be added to the brine to reduce or stop the fluid losses. The brine and additives return to the surface facility, where separation equipment is needed to remove the hydrocarbons from the brine prior to discharging the water into the sea or injecting it into the well.

Fine solid particles present in crude oil are capable of effectively stabilizing emulsions. The effectiveness of these solids in stabilizing emulsions depends on factors such as: solid particle size, interparticle interaction, and wettability of the solids.

Solid particles stabilize emulsions by diffusing to the oil/water interface, where they form rigid films that can sterically inhibit the coalescence of emulsion droplets. Furthermore, solid particles at the interface may be electrically charged, which may also enhance the stability of the emulsion. Particles must be much smaller than the size of the emulsion droplets to act as emulsion stabilizers. Typically, these solid particles are submicron to a few microns in diameter.

The wettability of the particles plays an important role in emulsion stabilization. Wettability is the degree to which a solid is wetted by oil or water when both are present. If the solid remains entirely in the oil or water phase, it will not be an emulsion stabilizer. For the solid to act as an emulsion stabilizer, it must be present at the interface and must be wetted by both the oil and water phases. In general, oil-wet solids stabilize a water-in-oil emulsion. Oil-wet particles preferentially partition into the oil phase and prevent the coalescence of water droplets by steric hindrance. Similarly, water-wet solids stabilize a water-continuous or an oil-in-water emulsion.

When solids are wetted by the oil and water (intermediate wettability), they agglomerate at the interface and retard coalescence. These particles must be repositioned into either the oil or water for coalescence to take place. This process requires energy and provides a barrier to coalescence.

The effectiveness of colloidal particles in stabilizing emulsions depends largely on the formation of a densely packed layer of solid particles (film) at the oil/water interface. This film provides steric hindrance to the coalescence of water droplets. The presence of solids at the interface also changes the rheological properties of the interface that exhibits viscoelastic behavior. This affects the rate of film drainage between droplets and affects the displacement of particles at the interface. It has also been demonstrated that for asphaltenes and waxes to be effective emulsifiers, they must be present in the form of finely divided submicron particles.

The present invention is distinguished from the prior art for the following reasons:

The present invention is distinguished from Ohsol (U.S. Pat. No. 4,938,876) as Ohsol does not disclose the use of a multicompartment separator tank. Furthermore, Ohsol does not utilize fluids at an ambient air temperature, unlike the present invention.

The present invention is distinguished from Moene (US Pat. App. 20140008271) as Moene does not disclose the use of a multicompartment separator tank. Furthermore, Ohsol does not utilize fluids at an ambient air temperature, unlike the present invention.

The present invention is distinguished from Wu (CN203284265) as Wu does not disclose the use of a multicompartment separator tank.

The present invention is distinguished from Govindan (U.S. Pat. No. 9,266,748) as 1) Govindan requires a heat exchange with a fluid, whereas the present invention utilizes ambient air temperature with no heat exchange, and 2) Govindan is also very complicated and requires many expensive steps for fluid treatment, whereas the present invention provides a reduced and more cost effective fluid treatment process that does not require a fluid heat exchange. Furthermore, 3) Govindan does not teach the use of a multicompartment separator as is claimed in the present invention.

The present invention is distinguished from Blazejczak (U.S. Pat. No. 4,990,246) as Blazejczak requires 1) a gas covering, 2) stators and rotors, and 3) a skimmer. The present invention is a multicompartment separator that specifically avoids the need for those aspects of Blazejczak, and is therefore an improvement regarding efficiency and cost over Blazejczak.

SUMMARY

In some embodiments, the present invention is a system for deck drainage treatment comprising: FPSO fluid compartments; a pump; a hydrocyclone desander capable of desanding; and/or a non-consumable or consumable mechanical solids filter capable of mechanical filtration; and a membrane filtration unit that is a membrane unit with a polymeric membrane filter; and some embodiments contain a Granular Activated Carbon housed in bulk vessels or cartridges used to remove water soluble organics if present in the fluids; wherein fluid is passed into said FPSO fluid compartments, said fluid is then capable of being pumped via said pump to either said hydrocyclone desander for desanding and/or said non-consumable or consumable mechanical solids filter for mechanical filtration; said fluid is then passed into said membrane unit that is a membrane unit with a polymeric membrane filter; and in some embodiments, Granular Activated Carbon housed in bulk vessels or cartridges used to remove water soluble organics if present in the fluids; and wherein water derived from said fluid passing into said FPSO fluid compartments, said fluid is then capable of being pumped via said pump to either said hydrocyclone desander for desanding and or said non-consumable or consumable mechanical solids filter for mechanical filtration; said fluid is then passed into said membrane filtration unit which is a membrane filtration unit with a polymeric membrane filter where clean permeate is discharged, and in some embodiments, Granular Activated Carbon housed in bulk vessels or cartridges used to remove water soluble organics if present in the fluids, and the concentrated fluid is recirculated to said FPSO fluid compartment. In some embodiments of the present invention, the present invention treats fluids at ambient air temperature. In some embodiments of the present invention, the present invention utilizes a multicompartment separator that does not have rotors or skimmers.

In some embodiments, the present invention is a system for Enhanced Oil. Recovery (EOR) Polymer Flood & Alkali Surfactant Polymer (ASP) treatment comprising: a separator or holding tank; a pump; a hydrocyclone desander capable of desanding; a non-consumable or consumable mechanical solids filter capable of mechanical filtration; and a membrane filtration unit that is a membrane unit with a polymeric membrane filter; wherein fluid passed into said separator or holding tank enters through said intake valve and is treated for bulk oil, gas and solids separation; said fluid is then capable of being pumped via said pump to either said hydrocyclone desander for desanding and/or said non-consumable or consumable mechanical solids filter for mechanical filtration; said fluid is then passed into said membrane filtration unit which is) a membrane filtration unit with a polymeric membrane filter; and wherein water derived from said passing into said separator or holding tank enters through said intake valve and is treated for bulk oil, gas and solids separation; said fluid is then capable of being pumped via said pump to either said hydrocyclone desander for desanding and/or said non-consumable or consumable mechanical solids filter for mechanical filtration; said fluid is then passed into said membrane filtration unit which is a membrane filtration unit with a polymeric membrane filter where clean permeate is discharged, and the concentrated fluid is recirculated to said pump. In some embodiments of the present invention, the present invention treats fluids at ambient air temperature. In some embodiments of the present invention, the present invention utilizes a multicompartment separator that does not have rotors or skimmers.

In several embodiments of the present invention, one aspect is to combine multiple technologies into one container: a pump; a hydrocyclone desander capable of desanding; a non-consumable or consumable mechanical solids filter capable of mechanical filtration; and a membrane filtration unit which is a membrane filtration unit with a polymeric membrane filter. This will allow for the equipment to be ready for service faster than that of any other companies on the market. All other companies utilize modular equipment in this market, which takes many hours to rig up and have ready for service. In several embodiments of the present invention, materials such as filters are reusable after cleaning.

In some embodiments, the tank, typically in the hull, will send water via a pump through a desanding hydrocyclone, and/or solids filter, and oil & solids removal membrane filter. The membrane is a crossflow technology which consists of recirculation loop from pump through the membrane and back into the tank in the hull of the ship. Crossflow is needed to keep solid contaminates away from the membrane surface. Adding induced gas or dissolved gas can increase the agitation inside of the membrane, as well as decrease the overall viscosity of the raw fluids, which will help in keeping the solids from attaching to the membrane surface. In some embodiments of the present invention, the present invention treats fluids at ambient air temperature. In some embodiments of the present invention, the present invention utilizes a multicompartment separator that does not have rotors or skimmers.

In some embodiments, the fluids from a single well or multiple wells resulting from acid stimulation, or well completions, are sent to a three-phase separation vessel to release the lighter hydrocarbons gas phase, heavier hydrocarbons oil phase, and water and solids. The bulk of the heavy hydrocarbons and most of the light hydrocarbons will be removed in this vessel. The remaining hydrocarbons typically range in concentrations from 200 mg/L to 5,000 mg/L, depending on the emulsified state of the hydrocarbons, and will be sent to a lower pressure multipurpose separations vessel (this can be either a pressure vessel or an atmospheric vessel). Different applications will have different amounts of oil in the water. The more the oil is emulsified, the more oil will be in the water after it leaves. A 3-phase separator can be used in some embodiments. In some embodiments of the present invention, the present invention treats fluids at ambient air temperature. In some embodiments of the present invention, the present invention utilizes a multicompartment separator that does not have rotors or skimmers.

In some embodiments, this vessel, tank, or multicompartment separator typically will have multiple compartments, including, but not limited to, an inlet compartment containing an inlet diffuser designed to further degas fluids, mix chemicals if they are required, a recirculation compartment, a clean water compartment, and an oil compartment. The water phase from this vessel, tank, or multicompartment separator will be pumped through a desanding hydrocyclone, and/or solids filter, and an oil & solids removal membrane filter. In some embodiments of the present invention, the present invention treats fluids at ambient air temperature. In some embodiments of the present invention, the present invention utilizes a multicompartment separator that does not have rotors or skimmers.

In some embodiments, the membrane is a crossflow technology which consists of a circulation loop from a pump through a membrane and back into the suction of the pump. Crossflow is needed to keep solid contaminates away from membrane surface. Adding induced gas or dissolved gas will increase the agitation inside of the membrane, as well as decrease the overall viscosity of the raw fluids, which will help in keeping the solids from attaching to the membrane surface.

In some embodiments of the present invention, one aspect of the present invention is to combine multiple technologies into one container; centrifugal pumps with variable speed drive, desander hydrocyclone and/or mechanical solids filters, and oil & solids removing membranes. This will allow for the equipment to be ready for service faster than that of any other companies on the market. All other companies have modular equipment in this market, which takes many hours to rig up and have ready for service. In some embodiments of the present invention, the present invention treats fluids at ambient air temperature. In some embodiments of the present invention, the present invention utilizes a multicompartment separator that does not have rotors or skimmers.

BRIEF DESCRIPTION OF THE DRAWINGS

For a more complete understanding of the present disclosure and the advantages thereof, reference is now made to the following descriptions to be taken in conjunction with the accompanying drawings describing specific embodiments of the disclosure, wherein.

DETAILED DESCRIPTION

Figure 2:
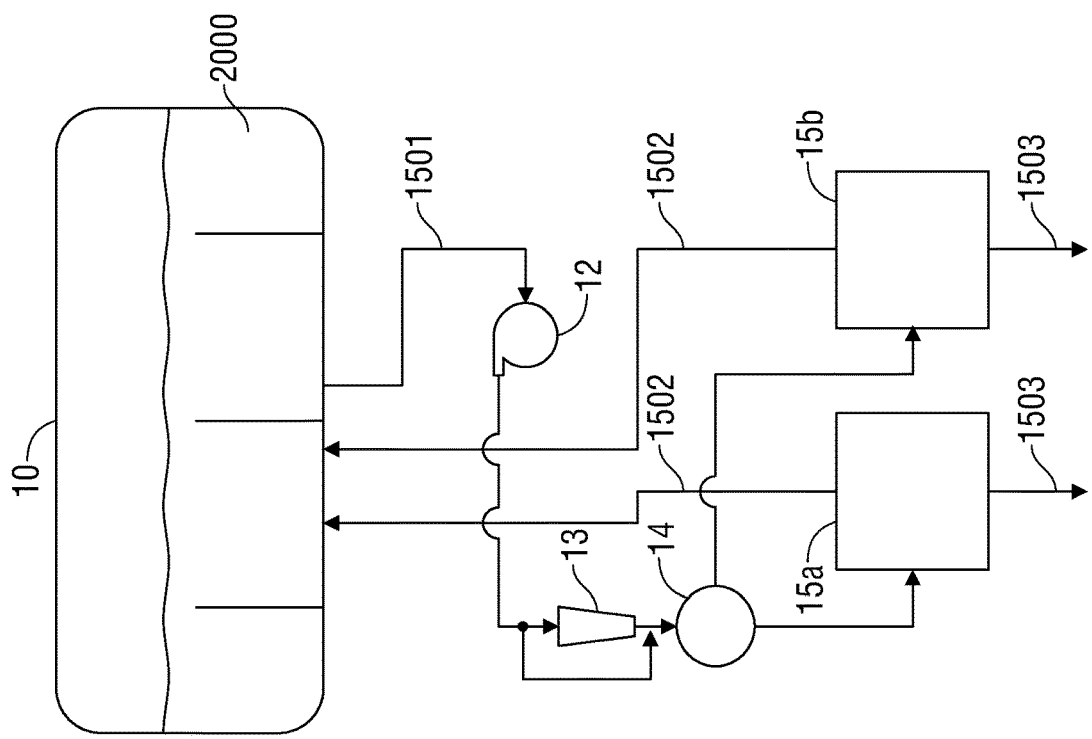
FIG. 2 is a flow diagram of one embodiment of the present invention for FPSO Slop Water treatment.

One or more illustrative embodiments incorporating the invention disclosed herein are presented below. Applicant has created a revolutionary industrial water cleaning process, system and method.

In the following description, certain details are set forth such as specific quantities, sizes, etc. to provide a thorough understanding of the present embodiments disclosed herein. However, it will be evident to those of ordinary skill in the art that the present disclosure may be practiced without such specific details. In many cases, details concerning such considerations and the like have been omitted inasmuch as such details are not necessary to obtain a complete understanding of the present disclosure and are within the skills of persons of ordinary skill in the relevant art.

Referring to the drawings in general, it will be understood that the illustrations are for the purpose of describing embodiments of the disclosure and are not intended to be limiting thereto. Drawings are not necessarily to scale, and arrangements of specific units in the drawings can vary.

While most of the terms used herein will be recognizable to those of ordinary skill in the art, it should be understood, however, that when not explicitly defined, terms should be interpreted as adopting a meaning presently accepted by those of ordinary skill in the art. In cases where the construction of a term would render it meaningless or essentially meaningless, the definition should be taken from Webster's Dictionary 2016. Definitions and/or interpretations should not be incorporated from other patent applications, patents, or publications, related or not, unless specifically stated in this specification, or if the incorporation is necessary for maintaining validity.

Certain terms are used in the following description and claims to refer to system components. As one skilled in the art will appreciate, different persons may refer to a component by different names. This document does not intend to distinguish between components that differ in name but not function. The drawing figures are not necessarily to scale. Certain features of the invention may be shown exaggerated in scale or in somewhat schematic form, and some details of conventional elements may not be shown, all in the interest of clarity and conciseness. As utilized herein, the term "Mechanical Solids Filters" is defined as "a type of filter that is primarily designed to remove suspended solid particles. As utilized herein, the term "Consumable solids filters" is defined as "a depletable solids filter." As utilized herein, the term "Non-consumable solids filters" is defined as "a non-depletable solids filter." As utilized herein, the term "ambient" is defined as "relating to the immediate surroundings of something." In some embodiments, the ambient temperature of the fluid or water can be affected by the location of water origination, such as, but not limited to, underground or above ground, and possibly have a temperature range of 50-175 degrees Fahrenheit. In several embodiments, the ambient temperature is the temperature of the fluid as it enters the present inventive system.

Although several preferred embodiments of the present invention have been described in detail herein, the invention is not limited hereto. It will be appreciated by those having ordinary skill in the art that various modifications can be made without materially departing from the novel and advantageous teachings of the invention. Accordingly, the embodiments disclosed herein are by way of example. It is to be understood that the scope of the invention is not to be limited thereby.

Figure 1:
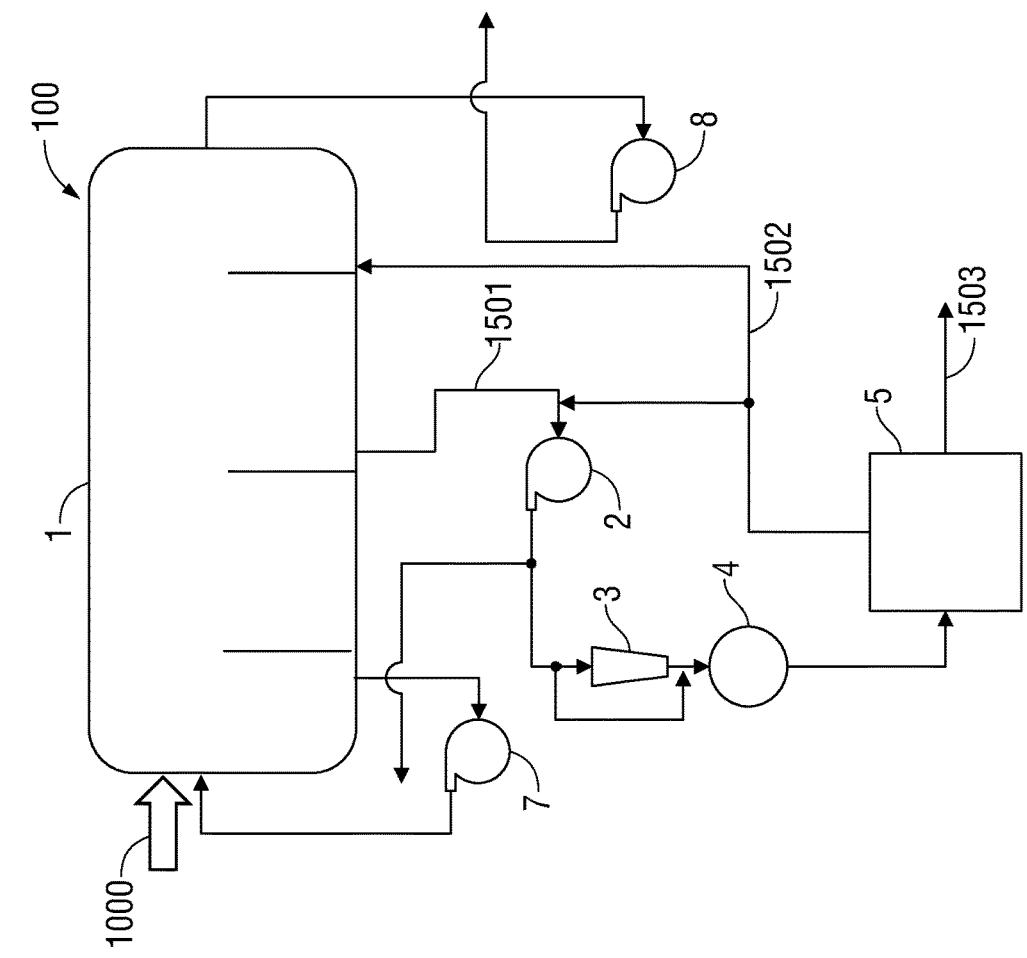
FIG. 1 is a flow diagram of one embodiment of the present invention for acid and completion treatment.

FIG. 1 illustrates one embodiment of the present invention 100 in a flow chart for acid and completion treatment. As shown, fluid 1000 can enter multicompartment separator 1. In several embodiments, the fluid 1000 is at ambient temperature. In several embodiments of the present invention, as shown in FIGS. 1-14, the said ambient temperature of the fluid 1000 is in a temperature range of 50-175 degrees Fahrenheit. In several embodiments, multicompartment separator 1 lacks any rotors and/or skimmers. In several embodiments, within multicompartment separator 1, the bulk of the free oil will separate by gravity, where it will be skimmed by an oil skim pipe into the oil compartment. In several embodiments, the water or fluid 1000 will weir. The separation tank takes in total fluids which has oil, water and solids. The inlet fluid post gravity separation in separation vessel is fluid 1501. The oil floats to the top and is skimmed off into the oil compartment plates from the last water compartment by pump 2 into hydrocyclone desander 3 or mechanical solids removal unit/filter 4. The remaining hydrocarbons typically range in concentrations from 200 mg/L to 5000 mg/L (free oil will float up to the top of the multipurpose separation vessel and will be skimmed off of fluid as described in paragraph above), depending on the emulsified state of the hydrocarbons, and will be sent to a pressure multipurpose separations vessel or tank (this can be either pressure vessel or atmospheric vessel).

In several embodiments, the hydrocyclone desander 3, or solids removal filter 4, will receive water or fluid 1501 containing solids and hydrocarbons; the hydrocarbons can be free or emulsified in the water or fluid 1501. In several embodiments, pump 2 is a pump as known in the art for pumping water, or fluids, in an industrial cleaning process. In some instances, the water, or fluid, pumped by pump 2 can circumvent hydrocyclone desander 3 and be pumped directly into non-consumable or consumable mechanical solids unit 4. In several embodiments, the water can be pumped into non-consumable or consumable mechanical solids filter 4 after being processed by hydrocyclone desander 3.

In many embodiments, desanding hydrocyclone 3, called a desander, offers the highest throughput-to-size ratio of any solids-removal equipment. Generally, hydrocyclones operate by pressure drop. The feed, a mixture of liquids and solids, enters the hydrocyclone through the volute inlet at the operating feed pressure. The change in flow direction forces the mixture to spin in a radial vortex pattern. Because of the angular acceleration of the flow pattern, centrifugal forces are imparted on the solid particles, forcing them toward the internal wall of the cone. The solids continue to spin in a radial vortex pattern, down the length of the cone, and discharge through the apex, creating the underflow stream. Because of cone convergence, the liquid flow is reversed and sent upward through the vortex finder to create the overflow stream. The solids that exit through the apex collect into an accumulation chamber and are periodically purged, while the overflow discharges continually.

In many embodiments, the water, or fluid, from non-consumable or consumable mechanical solids filter 4 will flow into membrane filtration unit 5. After being processed by membrane filtration unit 5, the water, or fluid, can be broken down into two fluids concentrate, fluid 1502 and permeate 1503. It can then be discharged, and the water and oil that does not pass through membrane filtration unit 5 can then be recirculated back to pump 2 to further be processed through hydrocyclone desander 3, or non-consumable/consumable mechanical solids filter 4, or both. Recirculation pump 7 can recirculate fluids from multicompartment separator that may need chemical treatment and agitation (the amount of agitation may vary) to help break oil in water emulsions. Oil in water emulsion is when oil is in the form of very small and stable oil droplets in the water or fluid due to mechanical shearing or chemically induced.

In several embodiments, the membrane filtration unit 5 utilizes a crossflow technology which consists of a recirculation loop from pump 2 through the membrane filtration unit 5 and back into the suction of the pump 2; occasionally this fluid will need to be replaced with fresh fluids from separation vessel or tank to reduce the oil content that has increased during the concentration process. (See FIG. 11). In several embodiments, crossflow is needed to keep contaminates away from membrane surface 5. Adding gas induced gas or dissolved gas can increase the agitation inside of the membrane 5 as well as decrease the overall viscosity of the raw fluids 1000.

In several embodiments, the water, or fluid, 1000 to be treated will flow into a vessel, tank or multicompartment separator 1 that may have multiple compartments including, but not limited to, an inlet compartment containing an inlet diffuser designed to further degas fluids, mix chemicals if they are required, a recirculation compartment, a clean water compartment, and an oil compartment. The water, or fluid, phase from this vessel or tank will be pumped through a desanding hydrocyclone 3, and/or solids filter 4, and membrane unit 5.

FIG. 2 shows another embodiment of the present invention for FPSO slop water treatment. As shown, compromised water 2000 from FPSO fluid compartments 10 will be pumped by pump 12 into hydrocyclone desander 13. In several embodiments, compromised water 2000 will be at ambient temperature. The inlet fluid post gravity separation in separation vessel is fluid 1501. Pump 12 is a pump as known in the art for pumping water or fluids in an industrial cleaning process. In some instances, the water or fluids pumped by pump 12 can circumvent hydrocyclone desander 13 and be pumped directly into non-consumable or consumable mechanical solids filter 14. In several embodiments, the water or fluids 2000 can be pumped into non-consumable or consumable mechanical solids filter 14 after being processed by hydrocyclone desander 13. In many embodiments, solids removal vessel 14 will receive water containing solids and hydrocarbons; the hydrocarbons can be free or emulsified in the water. In many embodiments, the water from non-consumable or consumable mechanical solids filter 14 will flow into a membrane filtration unit 15a and or 15b. After being processed by membrane filtration unit 15a and or 15b, the water can then be discharged, and the water and oil that does not pass through membrane filtration units 15a and 15b can then be recirculated back to fluid holding tank 10 to further be processed through hydrocyclone desander 13 and or non-consumable or consumable mechanical solids filter 14, or both. After being processed by membrane filtration unit 15a or 15b the water, or fluid, 1500 can be broken down into two fluids, concentrate fluid 1502 and permeate 1503.

Figure 3:
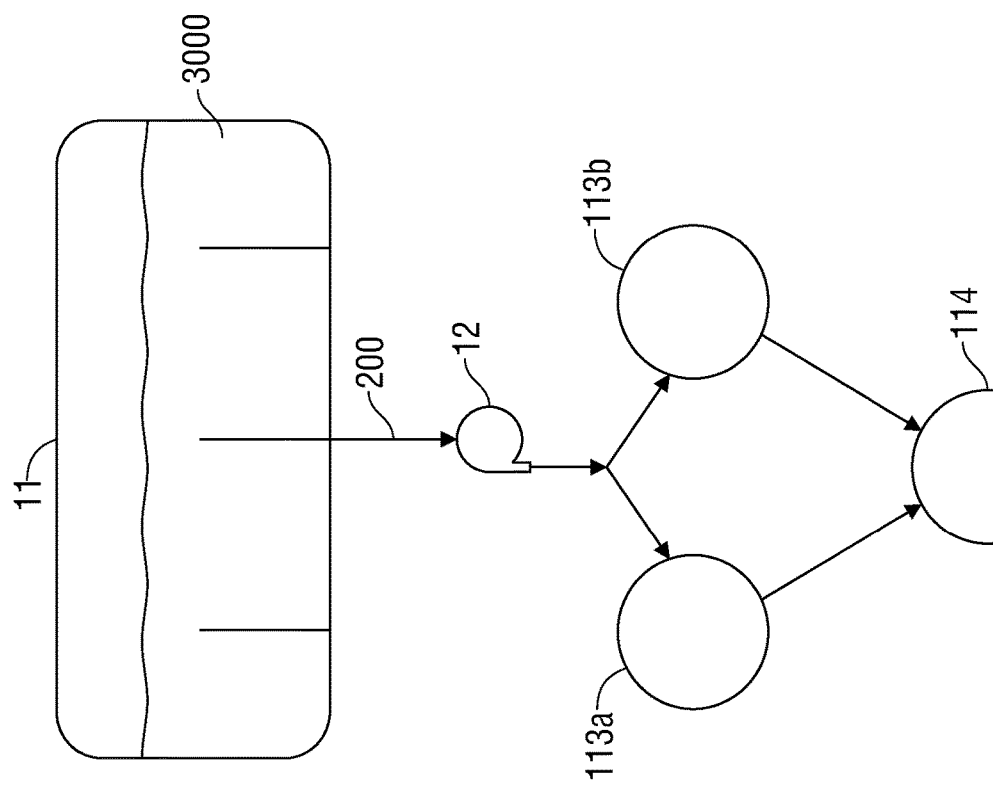
FIG. 3 is a flow diagram of another embodiment of the present invention for deck drainage treatment or FPSO slop water treatment.

FIG. 3 shows one embodiment of an alternative for deck drainage treatment or FPSO slop water treatment embodiment. In this embodiment, fluid 3000 leaves FPSO fluid compartment 11. In several embodiments, fluid 3000 is at ambient air temperature. The inlet fluid post gravity separation in separation vessel is fluid 200. In several embodiments, the contaminated water 200 from one of the fluid compartments 11 is pumped via pump 12 into either compressible oil coalescing and removal unit 113a or 113b, for compression oil coalescing and removal. In several embodiments, after treatment in removal units 113a or 113b, the treated water 200, if needed, is then sent into vertical or horizontal coalescing media unit 114 so that oil 300 (300 not shown on drawing) is then recycled for use.

In several embodiments, the water from the slops tank 11 will be pumped through the compressible oil coalescing and removal units 113a and or 113b that will receive water containing solids and hydrocarbons. The hydrocarbons can be free or emulsified in the water. During the removal of the hydrocarbons, the media is in a compressed state; different compressions allow for finer oil droplet removal, but the increased compression sacrifices surface area. During the cleaning of the media, after the media is saturated, the media is decompressed and agitated to allow flushing of the contaminates out from the oil coalescing media. The hydrocarbons are removed by flowing the oily water though a media consisting of polymeric fiber balls where the polymer attracts the oil and promotes coalescing. Once the oil droplets have increased in size, the velocities will push the large oil droplets through and out of the media, where it will float to the top of the vessel. The clean water will be discharged from the side of the hydrocarbon removal vessel.

Figure 4:
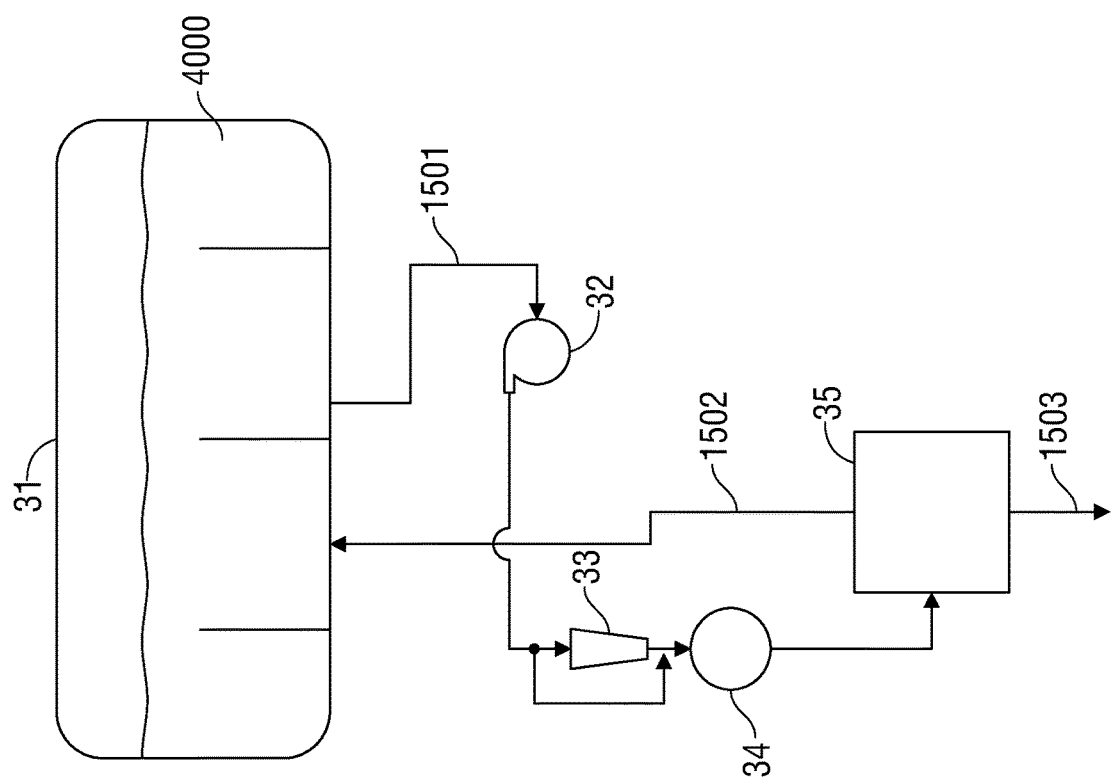
FIG. 4 illustrates one embodiment of the present invention for EOR Polymer Flood & ASP or deck drainage treatment.

FIG. 4 illustrates one embodiment of the present invention for EOR Polymer Flood & ASP or deck drainage treatment. As shown, water or fluid 4000 from one of the deck drainage holding compartments 31 can be pumped by pump 32 into hydrocyclone desander 33 and/or non-consumable or consumable mechanical solids filter 34. The inlet fluid post gravity separation in separation vessel is fluid 1501. In several embodiments, water or fluid 4000 will be at ambient temperature. The water, or fluid, 1501 (this water can be mostly rainwater and water used to clean deck) will then flow into membrane filtration unit 35. Water then passes through the membrane filtration unit 35 to be discharged, and the water and oil that does not pass through the membrane will be recirculated into one of the multiple fluid holding compartments 31. After being processed by membrane filtration unit 35, the water, or fluid, 1501 can be broken down into two fluids, concentrate fluid 1502 and permeate 1503.

Figure 5:
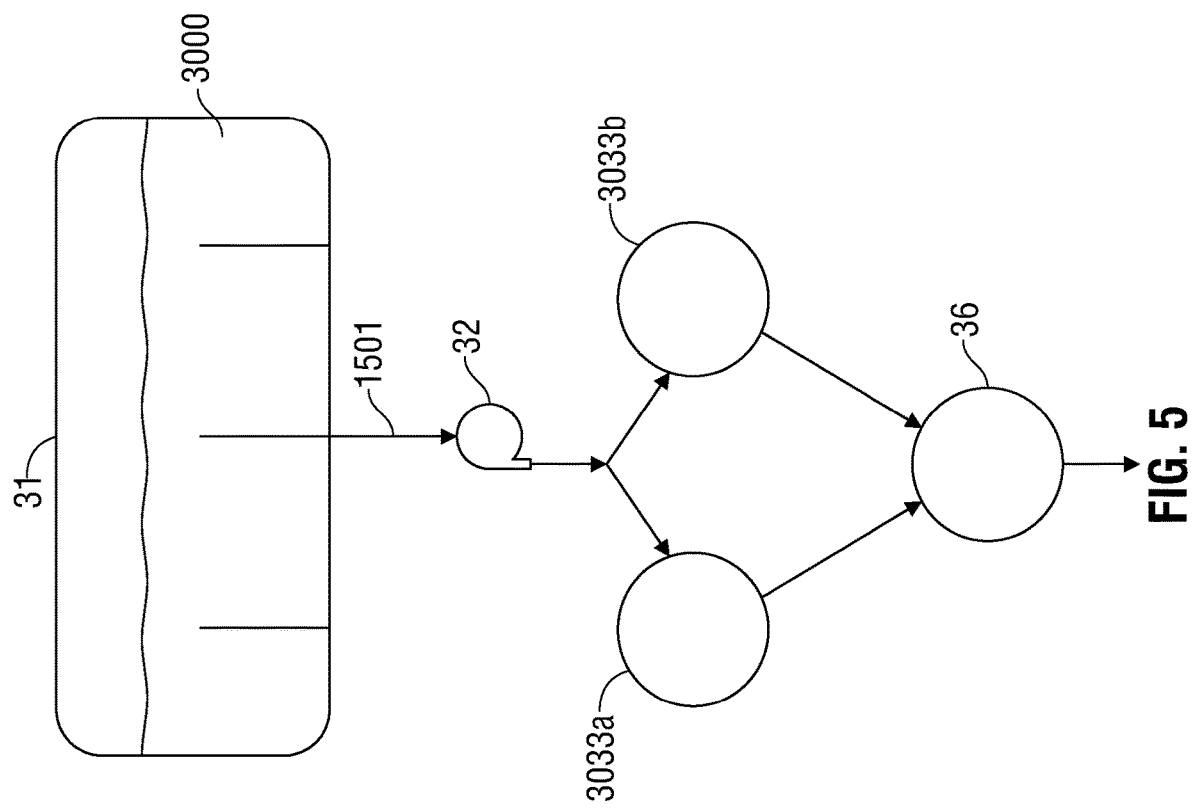
FIG. 5 is a flow diagram of one embodiment of the present invention for acid and completion or deck drainage treatment.

FIG. 5 illustrates an alternative embodiment for acid and completion or deck drainage treatment. The inlet fluid post gravity separation in separation vessel is fluid 1501. The oil that is coalesced will be separated and returned to a storage container. In several embodiments, water/fluid 3000 is at ambient air temperature. As shown, water/fluid 3000 from one of the deck drainage compartments 31 will be pumped by pump 32 (if pressure boost is needed) into compressible solids filter 3033a & 3033b. If needed, the water/fluid 3000 will then flow into said vertical or horizontal polishing unit 36 and will then be discharged.

In several embodiments, the water to be treated will flow into a vessel upstream of the compressible coalescing medias 3033a and 3033b. The water will flow through the coalescing media 33 in a compressed state where the solids will be removed, and the oil will be coalesced. The coalesced oil will separate by gravity separation alone or with micro bubbles to enhance the separation. The oil will be skimmed, and the water will be removed from the side of the vessel.

In several embodiments, vertical or horizontal polishing unit 36 is designed to remove the residual oil present in the fluids. The fluid with free and emulsified organics will flow from the inside inner core, through the media and out the outer core. The organics will be coalesced to form large oil droplets so that they will separate from the water and float to the top of the vessel or container the fluid is flowing into. The oil drops are large enough to separate from the water and will not re-disperse into the water.

In several embodiments, the vertical or horizontal polishing unit 36 has canisterized media in between that the fluid flows through. This media is a highly compressed to a specific hydraulic pressure and consists of an exact blend of fibers and proprietary polymers. The hydrocarbons are removed by flowing the oily water though a media consisting of a polymer and fiber where the polymer attracts the oil and promotes coalescing. Once the oil droplets have increased in size, the velocities will push the large oil droplets through and out of the media where it will float to the top of the vessel. The clean water will be discharged from the bottom of the hydrocarbon removal vessel.

Figure 6:
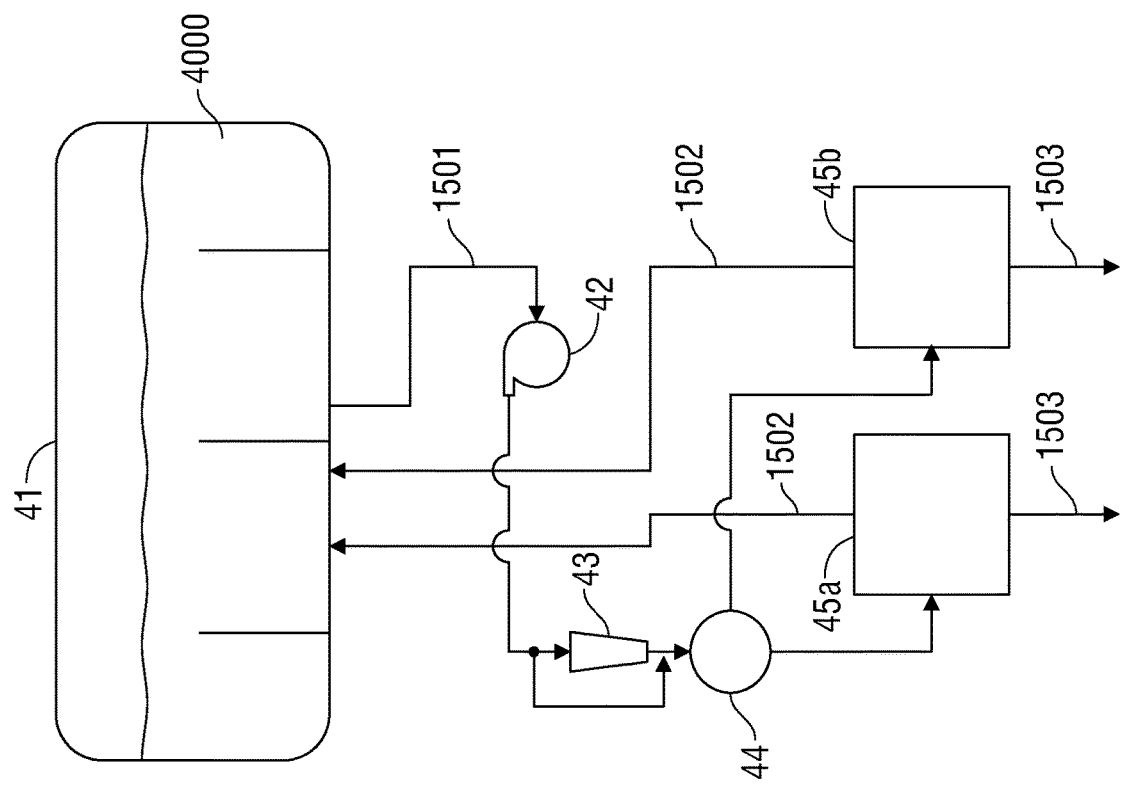
FIG. 6 is a flow diagram of one embodiment of the present invention for FPSO Slop Water or EOR Polymer Flood & ASP treatment.

FIG. 6 illustrates one embodiment of the present invention for FPSO Slop Water or EOR Polymer Flood & ASP treatment. As shown, water, or fluid, 4000 from one of the multicompartment separators or holding tank 41 will be pumped by pump 42 into hydrocyclone desander 43 and/or non-consumable or consumable mechanical solids filter 44. The inlet fluid post gravity separation in separation vessel is fluid 1501. In several embodiments, the fluid 4000 is at ambient temperature. In several embodiments, multicompartment separator 41 lacks any rotors or skimmers. The water, or fluid, will then flow into membrane filtration units 45a and/or 45b. From the membrane filtration units 45a and/or 45b, the water, or fluid, that passes through the membrane filtration unit will be discharged, and the water and oil that does not pass through the membrane filtration unit will be recirculated into one of the multiple fluid holding compartments 41. After being processed by membrane filtration units 45a and/or 45b, the water, or fluid, can be broken down into two fluids, concentrate fluid 1502 and permeate 1503.

Figure 7:
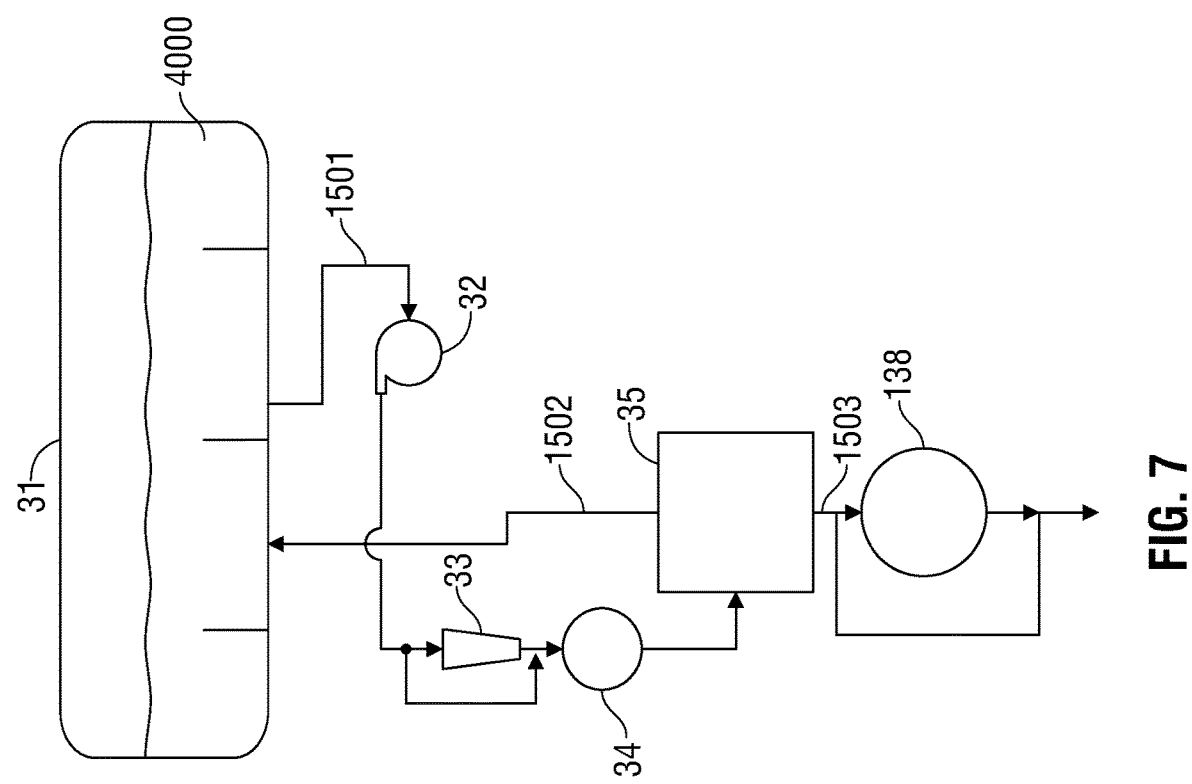
FIG. 7 is a flow diagram of another embodiment of the present invention for deck drainage treatment.

FIG. 7 illustrates one embodiment of the present invention for deck drainage treatment. As shown, water, or fluid, 4000 from one of the deck drainage holding compartments 31 will be pumped by pump 32 into hydrocyclone desander 33 and/or non-consumable or consumable mechanical solids filter 34. The inlet fluid post gravity separation in separation vessel is fluid 1501. In several embodiments, the fluid 4000 is at ambient temperature. In several embodiments, multicompartment separator 31 lacks any rotors or skimmers. In several embodiments, the water, or fluid 4000 will then flow into membrane filtration unit 35. Water, or fluid, 4000 then passes through the membrane filtration unit to be discharged, and the water and oil that does not pass through the membrane filtration unit 35 will be recirculated into one of the multiple fluid holding compartments 31. In several embodiments, after the water, or fluid 4000, flows into the membrane filtration unit 35, it will then flow into granular activated carbon housed in bulk vessels or cartridges 138, used to remove water soluble organics if present in the water or fluids. After being processed by membrane filtration unit 35, the water, or fluid, 1501 can be broken down into two fluids, concentrate fluid 1502 and permeate 1503.

Figure 8:
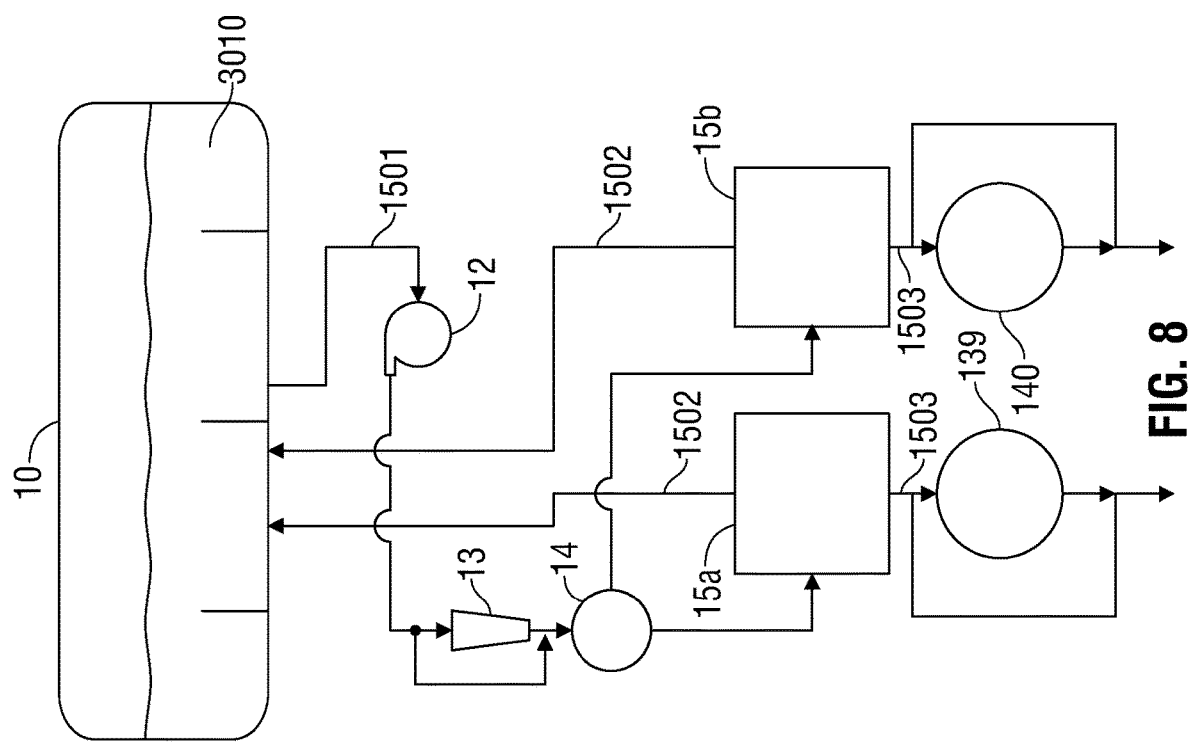
FIG. 8 illustrates one embodiment of the present invention for EOR Polymer Flood & ASP or FPSO Slop Water treatment.

FIG. 8 shows another embodiment of the present invention for EOR Polymer Flood & ASP or FPSO slop water treatment. As shown, compromised water 3010 from FPSO fluid compartments 10 water, or fluid, 3010 from one of the deck drainage holding compartments will be pumped by pump 12 into hydrocyclone desander 13. The inlet fluid post gravity separation in separation vessel is fluid 1501. In several embodiments, the fluid 3010 is at ambient temperature. In several embodiments, multicompartment separator 10 lacks any rotors or skimmers. In several embodiments, pump 12 is a pump as known in the art for pumping water or fluids in an industrial cleaning process. In some instances, the water pumped by pump 12 can circumvent hydrocyclone desander 13 and be pumped directly into non-consumable or consumable mechanical solids filter 14. In several embodiments, the water can be pumped into non-consumable or consumable mechanical solids filter 14 after being processed by hydrocyclone desander 13. In many embodiments, mechanical solids filter 14 will receive water containing solids and hydrocarbons; the hydrocarbons can be free or emulsified in the fluid or water.

In many embodiments, the water, or fluid, from non-consumable or consumable mechanical solids filter 14 will flow into membrane filtration units 15a and/or 15b. After being processed by membrane filtration units 15a and/or 15b, the water can then be discharged, and the water and oil that does not pass through membrane filtration units 15a and/or 15b can then be recirculated back to fluid holding tank 10 to further be processed through hydrocyclone desander 13 and/or non-consumable or consumable mechanical solids filter 14, or both. In several embodiments, after the water, or fluid, flows into the membrane filtration units 15a and/or 15b, it will then flow into granular activated carbon filter housed in bulk vessels or cartridges 139 or 140, used to remove water soluble organics if present in the fluids. After being processed by membrane filtration units 15a and/or 15b, the water, or fluid, 1501 can be broken down into two fluids, concentrate fluid 1502 and permeate 1503.

Figure 9:
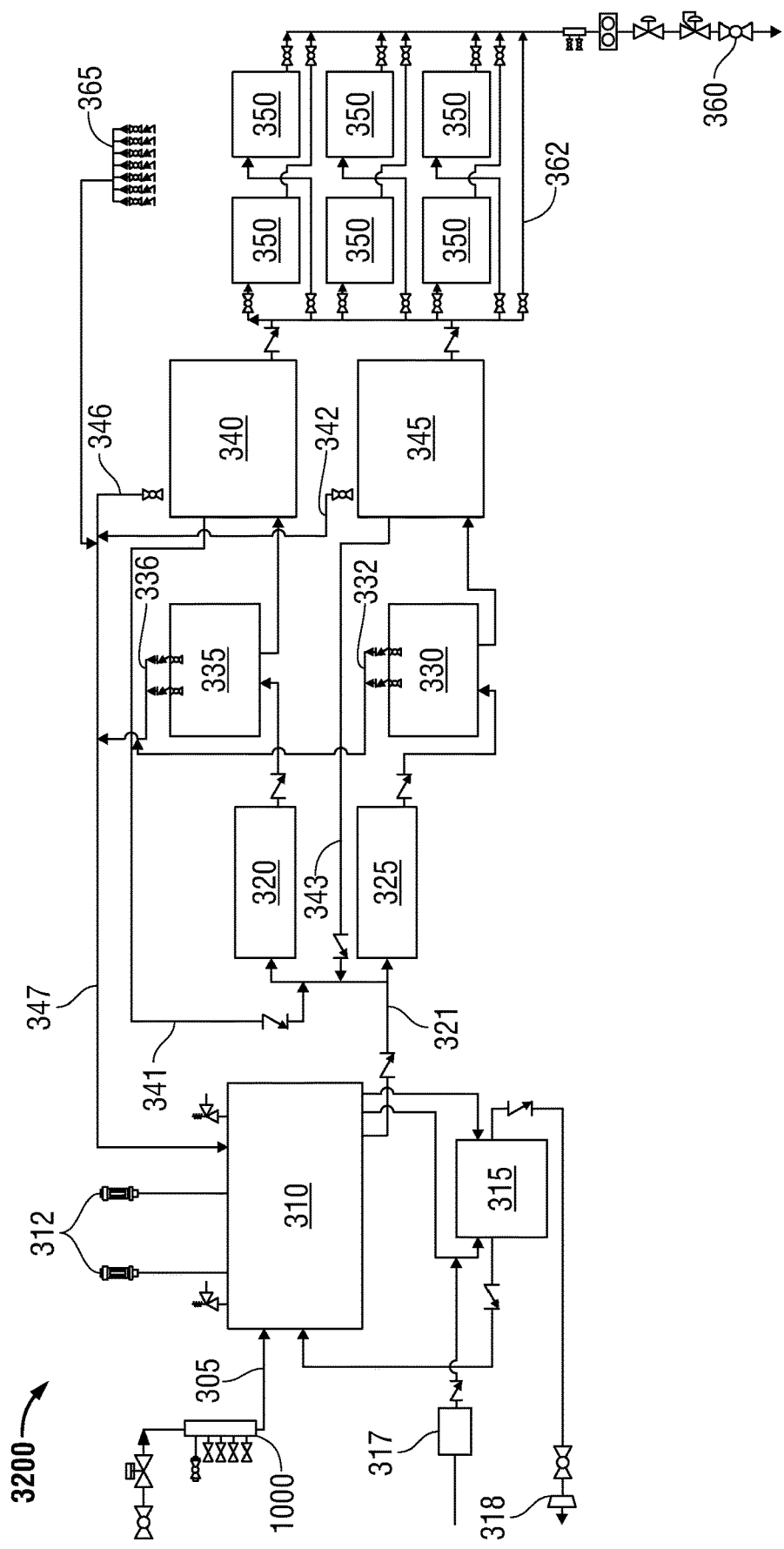
FIG. 9 illustrates one embodiment of the present invention for an entire fluid treatment system.

FIG. 9 illustrates one embodiment of the present invention for an entire fluid treatment system as a flow through process 3200. As illustrated, in one embodiment, fluid or water can come from what can be referred to as atmospheric holding tank 305 and enter separation tank 310. In several embodiments, multicompartment separation tank 310 is designed with a vent boom option 312. In several embodiments, the fluid 1000 is at ambient temperature. In several embodiments, multicompartment separation tank 310 lacks any rotors or skimmers. Once in the multicompartment separation tank 310, the fluid can be treated with a chemical clarifier 317, and some of the oil can be pumped back to what can be referred to as atmospheric holding tank 318 via pump 315.

In several embodiments, some of the fluid is pumped via line 321 through pumps 320 and/or 325 into a solids filter skids 335 and/or 330, respectively. In several embodiments, there are several bleed lines 332 and 336 associated with the solids filters skids 335 and/or 330 to allow for backwash. In some instances, back wash can be done with clean permeate, fresh water, or sea water depending on application, and bleed to be transported back to the multicompartment separator tank 310 through bleed line 347.

In several embodiments, after the solids are filtered in the solids filter skids 330 and/or 335, the fluid will flow into the membrane filters 340 and/or 345. In several embodiments, there are several bleed lines 342 and 346 associated with the membrane filters (in some instances spiral wound polymeric membranes, hollow fiber membranes, ceramic or flat sheet membranes) 340 and/or 345 to allow for backwash and bleed to be transported back to the multicompartment separator tank 310 through bleed line 347. In several embodiments, bleed line 347 has a bleed header (in some instances either hoses or pipe tied in together to comingle fluids into one line) 365 attached before bleed lines 342 and 346. In several embodiments, there are two concentrated recirculation lines 347 and 343 which run from membrane filters 340 and 345 back to the pump line 321. In some instances, this line is used to feed suction of second pump to keep the pressure and flow rate needed to flow through the membrane filters.

In several embodiments, after the fluid passes through the membrane filters 340 and/or 345, it then is cycled through the carbon filters 350 and then to the overboard, or egress line 360. In some embodiments, there is a bypass line 362 in which fluid can bypass the carbon filters 350.

Figure 10:
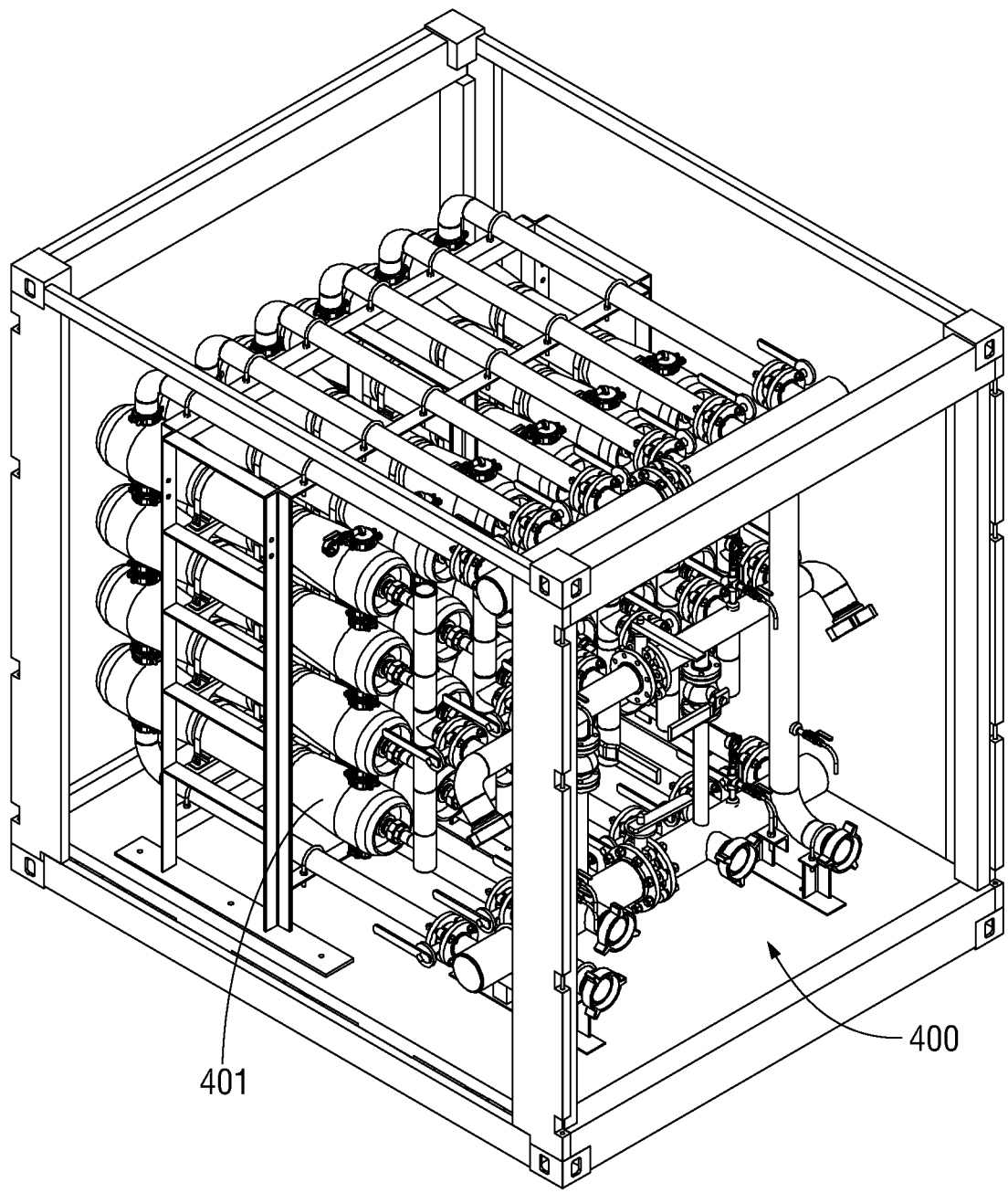
FIG. 10 illustrates one embodiment of the present invention regarding a membrane filter containment unit.

FIG. 10 illustrates one embodiment of the present invention regarding a membrane containment vessel. As shown, is one embodiment of membrane containment vessel 400 with several membrane units 401. In several embodiments, centrifugal pumps, such as some pumps utilized in the present invention, are the most commonly used kinetic-energy pump. Centrifugal force pushes the liquid outward from the eye of the impeller where it enters the casing. Differential head can be increased by turning the impeller faster, using a larger impeller, or by increasing the number of impellers. The impeller and the fluid being pumped are isolated from the outside by packing or mechanical seals. Shaft radial and thrust bearings restrict the movement of the shaft and reduce the friction of rotation.

Figure 11:
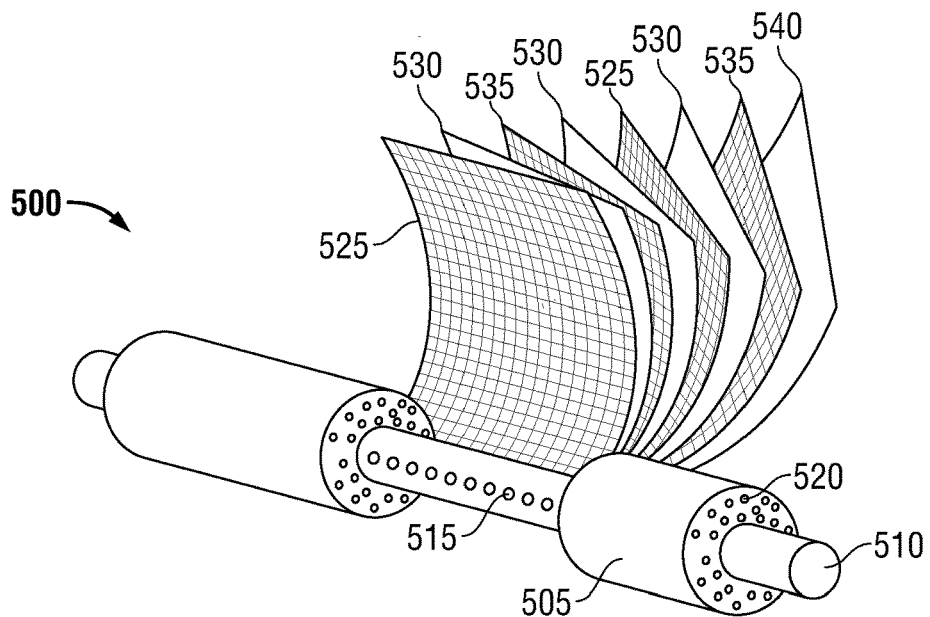
FIG. 11 illustrates one embodiment of the present invention regarding membrane filtration.

FIG. 11 illustrates one embodiment of the present invention regarding the interior of a membrane filter unit 500. As shown, in one embodiment, the membrane filter unit 500 contains a permeate tube 510 with perforations 515 and a wrapped body 505. In several embodiments, the wrapped body 505 consists of multiple layers of materials including layers of a permeate spacer 525, a membrane 530, a feed channel spacer 535, and an outer wrap 540. In several embodiments, the outer wrap 540 is nonpermeable. In some embodiments, the present invention utilizes spiral wound polymeric membranes, hollow fiber membranes, ceramic or flat sheet membranes. In several embodiments, there are several bleed lines 332 and 336 associated with the solids filters 335 and 330 to allow for backwash and bleed to be transported back to the multicompartment separator tank 310 (See FIG. 9).

In several embodiments (FIG. 11), the spiral wound elements consist of membranes 530, feed spacers 535, permeate spacers 525, and a permeate tube 510. In some embodiments, the purpose of the feed spacer 535 is to provide space for water, or fluid, to flow between the membrane surfaces 530, and to allow for uniform flow between the membrane leaves 530.

In some embodiments, fluid travels through the flow channels tangentially across the length of the permeate tube 510. Filtrate will then pass across the membrane surface 530 into the permeate spacer 525, where it is carried down the permeate spacer towards the permeate tube 510. The feed then becomes concentrated at the end of the element body. In some embodiments, filtration is any of various mechanical or physical operations that separate solids and oil from fluids.

Figure 12:
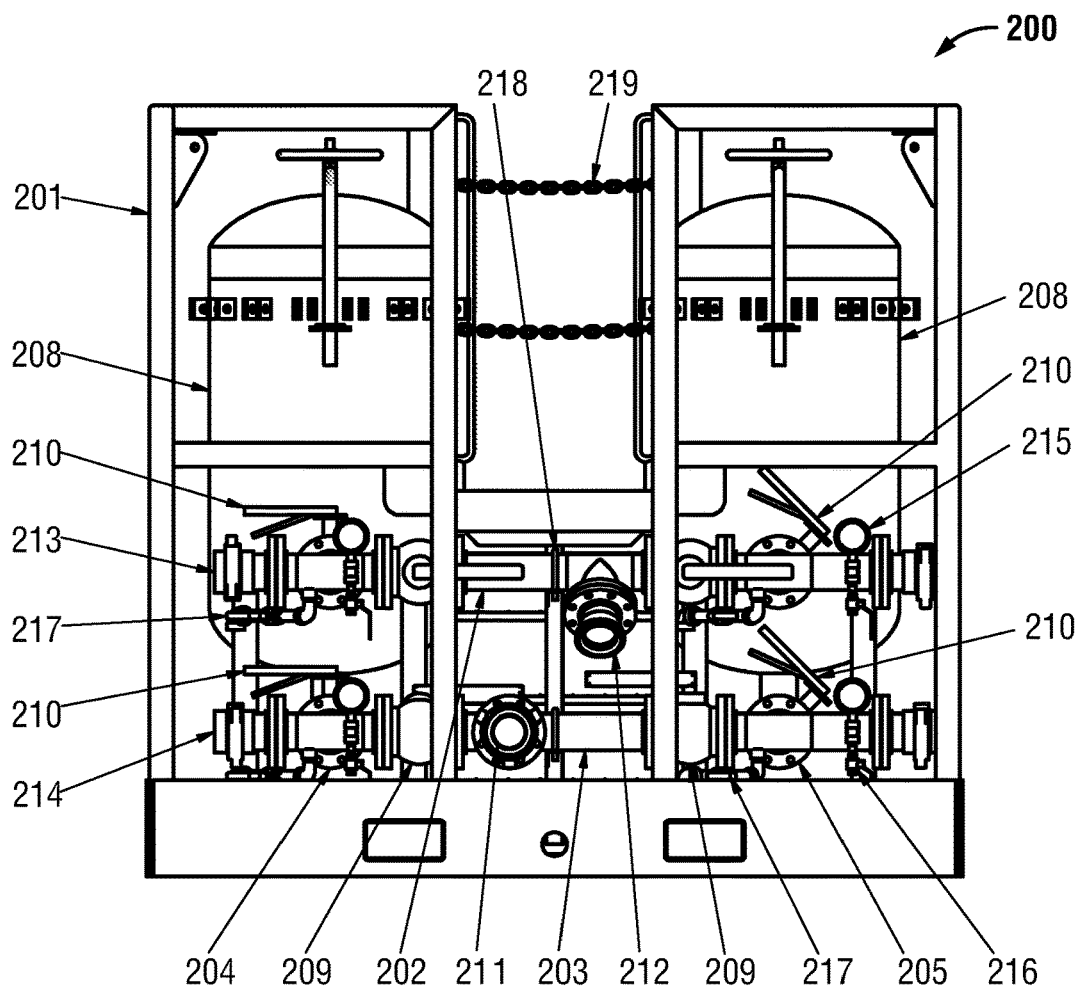
FIG. 12 illustrates one embodiment of the present invention regarding double tank solids filtration.

FIG. 12 illustrates one embodiment of the present invention regarding dual vessel (with two vessels, one to be online, with one as back up) solids filtration wherein said filter removes solids present in the fluid or water) unit. As shown, is one embodiment of a double tank filtration system 200. Illustrated is the skid weldment 201, along with piping 202-205. Further shown, is grating 201 which may be comprised of fiberglass, or other suitable material. Vessel 208 maybe comprised of stainless steel or other suitable materials. Ball valve 209 and butterfly valve 210 are for illustrative purposes, but could be any valve suitable for operation. Wingnuts 211 and 213 are illustrated, as are female adaptors or plugs 212 and 214. Further illustrated is pressure gauge 215 and ball valve 216. Ball valve, or another suitable valve 217 is illustrated, as is U-bolt 218. Chain 219 is also illustrated.

Figure 13:
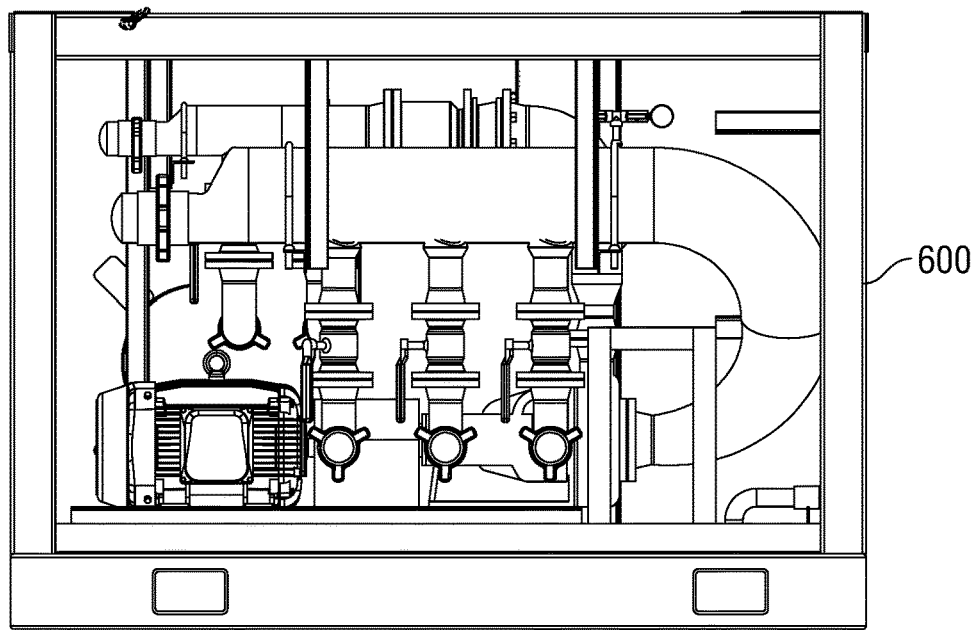
FIG. 13 illustrates one embodiment of the present invention regarding a centrifugal pump with a header.

FIG. 13 illustrates one embodiment of the present invention in regard to a centrifugal pump with a header. As shown in FIG. 13 is a centrifugal pump with a header 600.

Figure 14:
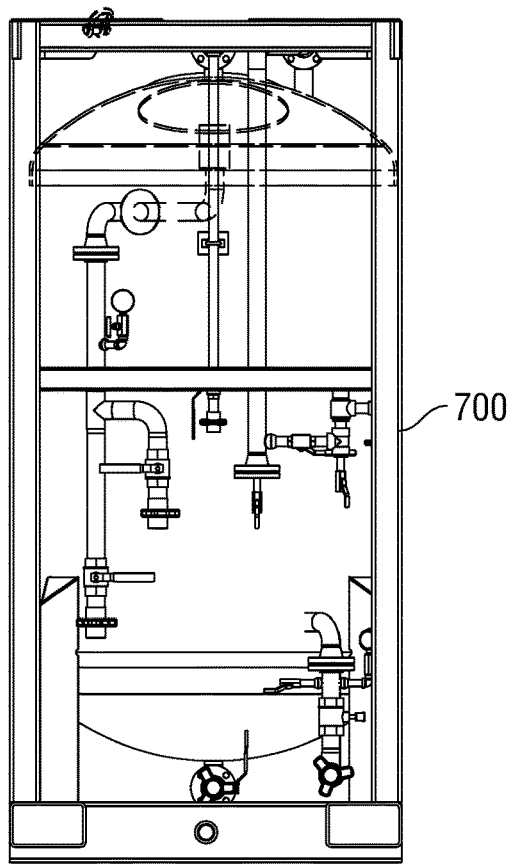
FIG. 14 illustrates one embodiment of the present invention regarding an activated carbon filtration vessel.

FIG. 14 illustrates one embodiment of the present invention regarding a carbon filtration vessel. As illustrated, is one embodiment of a carbon filtration vessel 700 as is used in the present invention.

Figure 15:
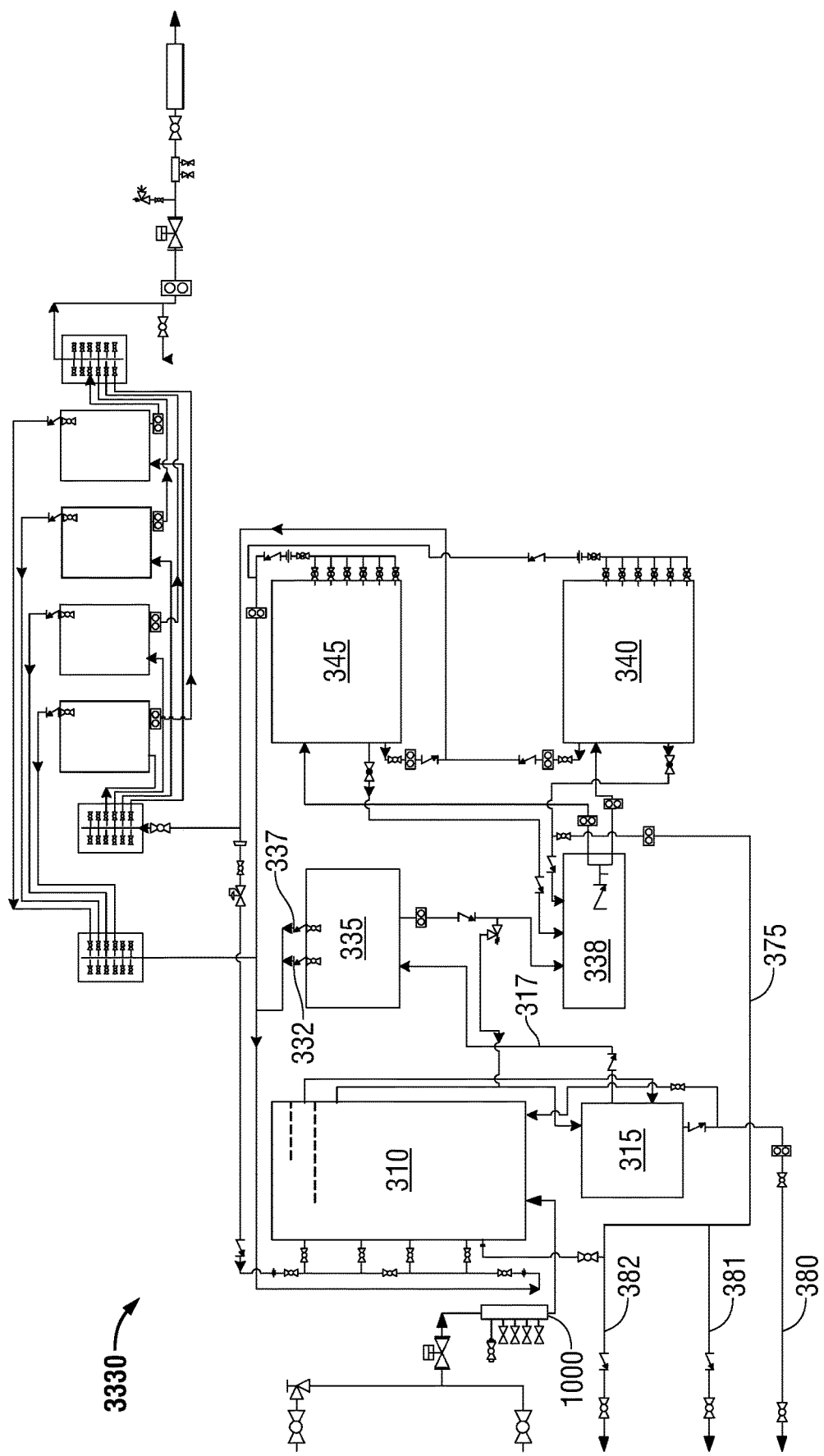
FIG. 15 illustrates one embodiment of the present invention for an entire fluid treatment system.

FIG. 15 illustrates one embodiment of the present invention for an entire fluid treatment system as a flow through process 3330. As illustrated, in one embodiment fluid or water can come from what can be referred to as atmospheric holding tank 305 and enter separation tank 310. In several embodiments, separation tank 310 is designed with a vent boom option 312. In several embodiments, the fluid 1000 is at ambient temperature. In several embodiments, multicompartment separation tank 310 lacks any rotors or skimmers. Some oil containing fluid can also be pumped by pump 315 into an atmosphere holding oil tank via line 380.

In several embodiments, some of the fluid is pumped via line 317 into a solids filter skid 335. In several embodiments, there are several bleed lines 332 and 337 associated with the solids filter 335 to allow for oil and air bleed.

In several embodiments, after the solids are filtered in the filter skid 335, the fluid will flow into the membrane filtration units 340 and/or 345 via pump 338. In several embodiments, there are several bleed lines 342 and 346 associated with the membrane filter units (in some instances spiral wound polymeric membranes, hollow fiber membranes, ceramic or flat sheet membranes) 340 and/or 345 to allow for backwash and bleed to be transported back to the multicompartment separator tank 310 through bleed line 347. In several embodiments, bleed line 347 has a bleed header (in some instances either hoses or pipe tied in together to comingle fluids into one line) 365 attached before bleed lines 342 and 346. In several embodiments, there are two concentrated recirculation lines 347 and 343 which run from membrane filters 340 and 345 back to the pump line 321. In some instances, this line is used to feed suction of second pump to keep the pressure and flow rate needed to flow through the membranes. Additional bleed lines can be used in some embodiments as shown in FIG. 9.

In several embodiments, after the fluid passes through the membrane filter units 340 and/or 345, it then is cycled through fluid line 375, and then pumped into water tank line 382 or atmosphere tank 381.

In several embodiments, the present invention is a system for acid and completion treatment with a fluid at ambient temperature comprising: a multicompartment separation tank 310 with a vent boom; a chemical clarifier 317; a first pump 320 with first fluid lines; solids filter skid 335 with first fluid bleed lines 336 in fluid communication with said multicompartment separation tank 310 in order to allow for bleed from said solids filter 335 to be transported back to said multicompartment separator tank 310; second fluid lines; membrane filter 340 with second fluid bleed lines 346 in fluid communication with said multicompartment separation tank 310 in order to allow for bleed from said membrane filter 340 to be transported back to said separator tank 310; an egress line 360; wherein a fluid at ambient temperature can enter said multicompartment separation tank 310 and be treated with said chemical clarifier 317; said fluid is then pumped by said first pump 320 through said first fluid lines into said solids filter skid 335; said fluid is then pumped into said membrane filter 340 through said second fluid lines; and then fluid is pumped into said egress line 360. In several embodiments, two concentrated recirculation lines 341 and 343 run from said membrane filters 340 and 345 back to said first fluid line 321. In several embodiments, a carbon filter 350 is utilized after the fluid passes through said membrane filter 340 and then to the egress line 360. In several embodiments, said membrane filter 340 further comprises; a permeate tube 510 with perforation 515 and a wrapped body 505; said wrapped body 505 further comprises; multiple layers of materials including layers of a permeate spacer 525, a membrane 530, a feed channel spacer 535, and an outer wrap 540. In several embodiments, said outer wrap is nonpermeable. This wrap is made of fiberglass, but the membrane can also be made with permeable wrap. In several embodiments, said multicompartment separation tank 310, said pump 320, said solids filter 335, and said membrane filter are encapsulated as a single unit. As shown in FIG. 1, in several embodiments, the fluid can be pumped, pump 2, into hydrocyclone desander 3 or mechanical solids removal unit 4. This is typically a consumable or nonconsumable media that removes solids. Ergo, a hydrocyclone 3 can be inserted prior to the mechanical solids removal phase.

In several embodiments, the present invention is a system for Enhanced Oil Recovery Polymer Flood & Alkali Surfactant Polymer with a fluid at ambient temperature comprising: a multicompartment separation tank 310 with a vent boom 312; a chemical clarifier 317; a first pump 320 with first fluid lines; solids filter skid 335 with first fluid bleed lines 336 in fluid communication with said multicompartment separation tank 310 in order to allow for bleed from said solids filter 335 to be transported back to said multicompartment separator tank 310; second fluid lines; membrane filter 340 with second fluid bleed lines 346 in fluid communication with said multicompartment separation tank 310 in order to allow for bleed from said membrane filter 340 to be transported back to said separator tank 310; an egress line 360; wherein a fluid at ambient temperature can enter said multicompartment separation tank 310 and be treated with said chemical clarifier 317; said fluid is then pumped by said first pump 320 through said first fluid lines into said solids filter skid 335; said fluid is then pumped into said membrane filter 340 through said second fluid lines; and then fluid is pumped into said egress line 360. In several embodiments, two concentrated recirculation lines 341 and 343 run from said membrane filters 340 and 345 back to said first fluid line 321. In several embodiments, a carbon filter 350 is utilized after the fluid passes through said membrane filter 340 and then to the egress line 360. In several embodiments, said membrane filter 340 further comprises; a permeate tube 510 with perforation 515 and a wrapped body 505; said wrapped body 505 further comprises; multiple layers of materials including layers of a permeate spacer 525, a membrane 530, a feed channel spacer 535, and an outer wrap 540. In several embodiments, said outer wrap is nonpermeable. In several embodiments, said separation tank 310, said pump 320, said solids filter 335, and said membrane filter are encapsulated as a single unit. As shown in FIG. 1, in several embodiments, the fluid can be pumped, pump 2, into hydrocyclone desander 3 or mechanical solids removal unit 4. Ergo, a hydrocyclone 3 can be inserted prior to the mechanical solids removal phase.

In several embodiments, the present invention is a system for FPSO with a fluid at ambient temperature comprising: a multicompartment separation tank 310 with a vent boom 312; a chemical clarifier 317; a first pump 320 with first fluid lines; solids filter skid 335 with first fluid bleed lines 336 in fluid communication with said multicompartment separation tank 310 in order to allow for bleed from said solids filter skid 335 to be transported back to said multicompartment separator tank 310; second fluid lines; membrane filtration unit 340 with second fluid bleed lines 346 in fluid communication with said multicompartment separation tank 310 in order to allow for bleed from said membrane filtration unit 340 to be transported back to said multicompartment separator tank 310; an egress line 360; wherein a fluid at ambient temperature can enter said multicompartment separation tank 310 and be treated with said chemical clarifier 317; said fluid is then pumped by said first pump 320 through said first fluid lines into said solids filter skid 335; said fluid is then pumped into said membrane filtration unit 340 through said second fluid lines; and then fluid is pumped into said egress line 360. In several embodiments, two concentrated recirculation lines 341 and 343 run from said membrane filtration units 340 and 345 back to said first fluid line 321. In several embodiments, a carbon filter 350 is utilized after the fluid passes through said membrane filtration unit 340 and then to the egress line 360. In several embodiments, said membrane filtration unit 340 further comprises; a permeate tube 510 with perforation 515 and a wrapped body 505; said wrapped body 505 further comprises; multiple layers of materials including layers of a permeate spacer 525, a membrane 530, a feed channel spacer 535, and an outer wrap 540. In several embodiments, said outer wrap is nonpermeable. In several embodiments, said multicompartment separation tank 310, said pump 320, said solids filter 335, and said membrane filter are encapsulated as a single unit. As shown in FIG. 1, in several embodiments, the fluid can be pumped, pump 2, into hydrocyclone desander 3 or mechanical solids removal unit 4. Ergo, a hydrocyclone 3 can be inserted prior to the mechanical solids removal phase.

While preferred embodiments have been shown, and described, modifications thereof can be made by one skilled in the art without departing from the scope or teaching herein. The embodiments described herein are exemplary only and are not limiting. Many variations and modifications of the system and apparatus are possible and will become apparent to those skilled in the art once the above disclosure is fully appreciated. For example, the relative dimensions of various parts, the materials from which the various parts are made, and other parameters can be varied.

What is claimed is the following:

1. A method for acid and completion treatment flow back fluids with a fluid treatment at ambient temperature comprising:
   providing a system comprising:
   a multicompartment separation tank;
   a first pump;
   first fluid lines;
   a solids filter skid with first fluid bleed lines in fluid communication with said multicompartment separation tank in order to allow for bleed from said solids filter to be transported back to said separator tank;

second fluid lines;
at least one membrane filtration unit with second fluid bleed lines in fluid communication with said multicompartment separation tank in order to allow for bleed from said at least one membrane filtration unit to be transported back to said separator tank;
an egress line; and
flowing the fluid at ambient temperature, which enters said multicompartment separation tank; said fluid is then pumped by said first pump through said first fluid lines into said solids filter skid; said fluid is then pumped into said at least one membrane filtration unit through said second fluid lines; and then fluid is pumped into said egress line.

2. The method for acid and completion treatment of claim 1 further comprising
the at least one membrane filtration unit comprises two membrane filtration units and two concentrated recirculation lines which run from said membrane filtration units back to said first fluid lines.

3. The method for acid and completion treatment of claim 1 further comprising
a carbon filter in which after the fluid passes through said membrane filtration unit the fluid then is cycled through the granular carbon filter and then to the egress line.

4. The method for acid and completion treatment of claim 3 further comprising
said membrane filtration unit further comprises
a permeate tube with perforation and a wrapped body; said wrapped body further comprises
multiple layers of materials including layers of a permeable spacer, a membrane, a feed channel spacer, and an outer wrap.

5. The method for acid and completion treatment of claim 4 further comprising
said outer wrap is nonpermeable.

6. The method for acid and completion treatment of claim 1 further comprising
a hydrocyclone; wherein
said hydrocyclone is attached to said first pump and can provide an alternate fluid path before said solids filter.

7. A method for Enhanced Oil Recovery Polymer Flood & Alkali Surfactant Polymer treatment with a fluid at ambient temperature comprising:
providing a system comprising:
a multicompartment separation tank;
a first pump;
first fluid lines;
a solids filter skid with first fluid bleed lines in fluid communication with said multicompartment separation tank in order to allow for bleed from said solids filter to be transported back to said separator tank;
second fluid lines;
at least one membrane filtration unit with second fluid bleed lines in fluid communication with said multicompartment separation tank in order to allow for bleed from said at least one membrane filtration unit to be transported back to said separator tank;
an egress line; and
flowing the fluid at ambient temperature, which enters said multicompartment separation tank; said fluid is then pumped by said first pump through said first fluid lines into said solids filter skid; said fluid is then pumped into said at least one membrane filtration unit through said second fluid lines; and then fluid is pumped into said egress line.

8. The method for Enhanced Oil Recovery Polymer Flood & Alkali Surfactant Polymer treatment of claim 7 comprising
the at least one membrane filtration unit comprises two membrane filtration units and two concentrated recirculation lines which run from said membrane filtration units back to said first fluid lines.

9. The method for Enhanced Oil Recovery Polymer Flood & Alkali Surfactant Polymer treatment of claim 7 comprising further comprising
a carbon filter in which after the fluid passes through said membrane filtration unit the fluid then is cycled through the granular carbon filter and then to the egress line.

10. The method for Enhanced Oil Recovery Polymer Flood & Alkali Surfactant Polymer treatment of claim 9 comprising
said membrane filtration unit further comprises
a permeate tube with perforation and a wrapped body; said wrapped body further comprises
multiple layers of materials including layers of a permeable spacer, a membrane, a feed channel spacer, and an outer wrap.

11. The method for Enhanced Oil Recovery Polymer Flood & Alkali Surfactant Polymer treatment of claim 10 comprising
said outer wrap is nonpermeable.

12. The method for Enhanced Oil Recovery Polymer Flood & Alkali Surfactant Polymer treatment of claim 7 comprising
a hydrocyclone; wherein
said hydrocyclone is attached to said first pump and can provide an alternate fluid path before said solids filter.

13. A method for FPSO treatment with a fluid at ambient temperature comprising:
providing a system comprising:
a multicompartment separation tank;
a first pump;
first fluid lines;
a solids filter skid with first fluid bleed lines in fluid communication with said multicompartment separation tank in order to allow for bleed from said solids filter to be transported back to said separator tank;
second fluid lines;
at least one membrane filtration unit with second fluid bleed lines in fluid communication with said multicompartment separation tank in order to allow for bleed from said at least one membrane filtration unit to be transported back to said separator tank;
an egress line; and
flowing the fluid at ambient temperature, which enters said multicompartment separation tank; said fluid is then pumped by said first pump through said first fluid lines into said solids filter skid; said fluid is then pumped into said at least one membrane filtration unit through said second fluid lines; and then fluid is pumped into said egress line.

14. The method for FPSO treatment of claim 13 comprising
the at least one membrane filtration unit comprises two membrane filtration units and two concentrated recirculation lines which run from said membrane filtration units back to said first fluid lines.

15. The method for FPSO treatment of claim 13 comprising
a carbon filter in which after the fluid passes through said membrane filtration unit the fluid then is cycled through the granular carbon filter and then to the egress line.

16. The method for FPSO treatment of claim 13 comprising
- said membrane filtration unit further comprises
  - a permeate tube with perforation and a wrapped body;
  - said wrapped body further comprises
- multiple layers of materials including layers of a permeable spacer, a membrane, a feed channel spacer, and an outer wrap.

17. The method for FPSO treatment of claim 13 comprising
- said outer wrap is nonpermeable.

18. The method for FPSO treatment of claim 13 comprising
- a hydrocyclone; wherein
- said hydrocyclone is attached to said first pump and can provide an alternate fluid path before said solids filter.

19. A The method for acid and completion treatment of claim 1 further comprising
- said ambient temperature is in a temperature range of 50-175 degrees Fahrenheit.

20. The method for Enhanced Oil Recovery Polymer Flood & Alkali Surfactant Polymer treatment of claim 7 further comprising;
- said ambient temperature is in a temperature range of 50-175 degrees Fahrenheit.

\* \* \* \* \*